US011567819B2

(12) United States Patent
Narayanan et al.

(10) Patent No.: US 11,567,819 B2
(45) Date of Patent: Jan. 31, 2023

(54) FABRIC CONNECTION ASSIST SYSTEM

(71) Applicant: Dell Products L.P., Round Rock, TX (US)

(72) Inventors: Padmanabhan Narayanan, Redmond, WA (US); Ming Chung Chow, Pleasanton, CA (US); Ramar Nagaraj, Virudhunagar (IN)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 17/233,072

(22) Filed: Apr. 16, 2021

(65) Prior Publication Data

US 2022/0334910 A1 Oct. 20, 2022

(51) Int. Cl.
*H04L 29/06* (2006.01)
*H04L 29/08* (2006.01)
*G06F 11/07* (2006.01)
*H04L 67/141* (2022.01)
*H04L 43/0811* (2022.01)
*H04L 43/50* (2022.01)
*G06Q 10/10* (2012.01)

(52) U.S. Cl.
CPC ...... *G06F 11/0769* (2013.01); *G06F 11/0709* (2013.01); *H04L 43/0811* (2013.01); *H04L 43/50* (2013.01); *H04L 67/141* (2013.01); *G06Q 10/10* (2013.01)

(58) Field of Classification Search
CPC ............. G06F 11/0769; G06F 11/0709; H04L 43/0811; H04L 43/50; H04L 67/141; H04L 67/131
See application file for complete search history.

(56) References Cited

U.S. PATENT DOCUMENTS

| 10,243,785 | B1* | 3/2019 | Corrigan | H04L 41/0677 |
|---|---|---|---|---|
| 2013/0329548 | A1* | 12/2013 | Nakil | H04L 45/02 370/228 |
| 2016/0102878 | A1* | 4/2016 | Smith | H04L 12/2818 709/217 |
| 2016/0315964 | A1* | 10/2016 | Shetty | H04L 63/168 |
| 2016/0359997 | A1* | 12/2016 | Patel | H04L 67/567 |
| 2019/0335012 | A1* | 10/2019 | Patel | H04L 67/1006 |
| 2020/0396181 | A1* | 12/2020 | Lochhead | H04L 49/20 |

* cited by examiner

*Primary Examiner* — Christopher B Robinson
(74) *Attorney, Agent, or Firm* — Joseph Mencher

(57) ABSTRACT

A fabric connection assist system includes a networking device coupled to a fabric management system and a mobile device via a network. The networking device receives fabric connection information for its port from the fabric management system. When the mobile device subsequently identifies that port to the networking device, the networking device identifies fabric connection components to the mobile device that are indicated by the fabric connection information as being supported by its port. When the mobile device subsequently identifies a first of the fabric connection components to the networking device, and the networking device then detects that the first fabric connection component has been connected to its port, the networking device transmits a first fabric connection component confirmation communication to the mobile device that is configured to display a confirmation on the mobile device of the connection of the first fabric connection component to its port.

20 Claims, 15 Drawing Sheets

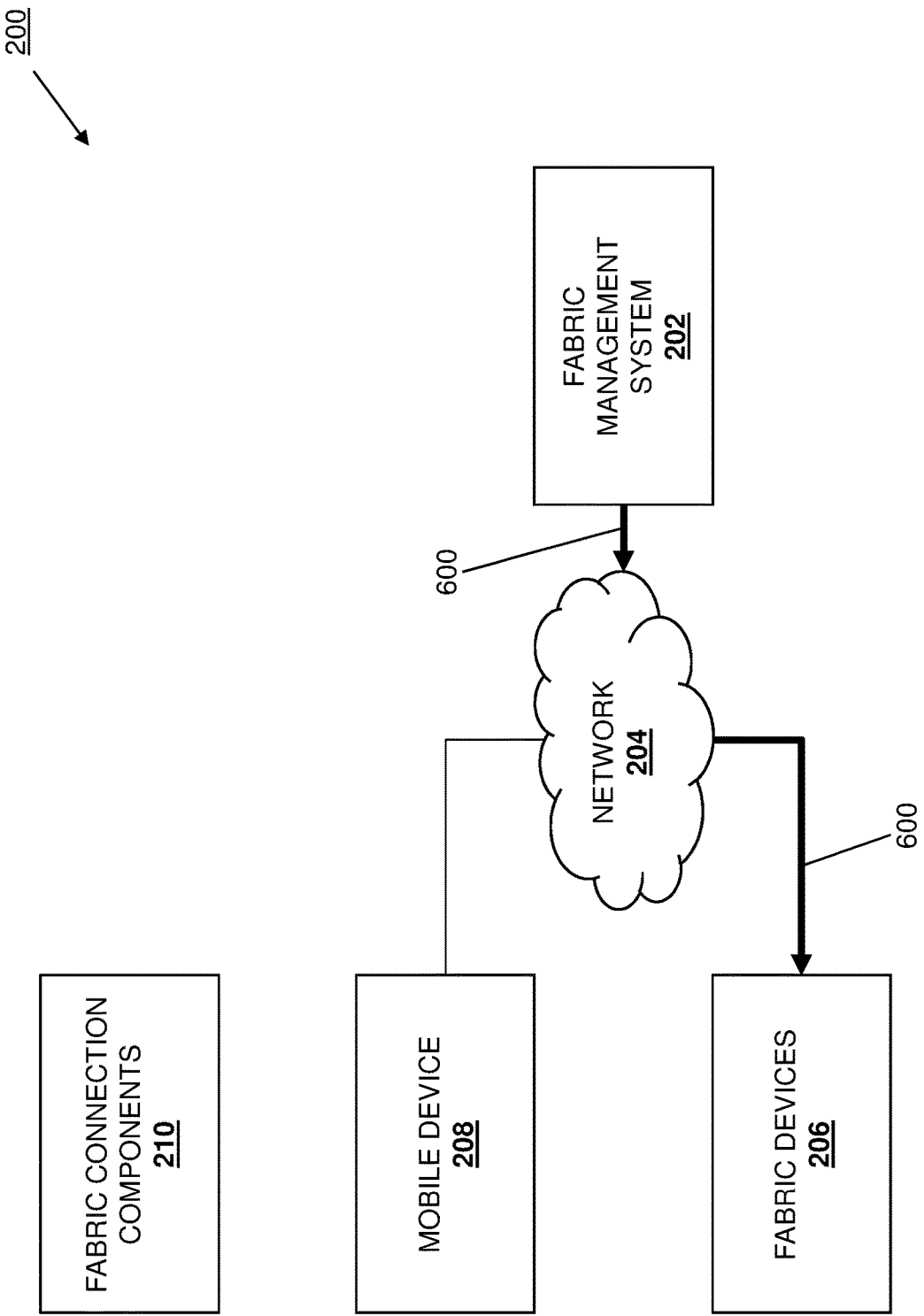

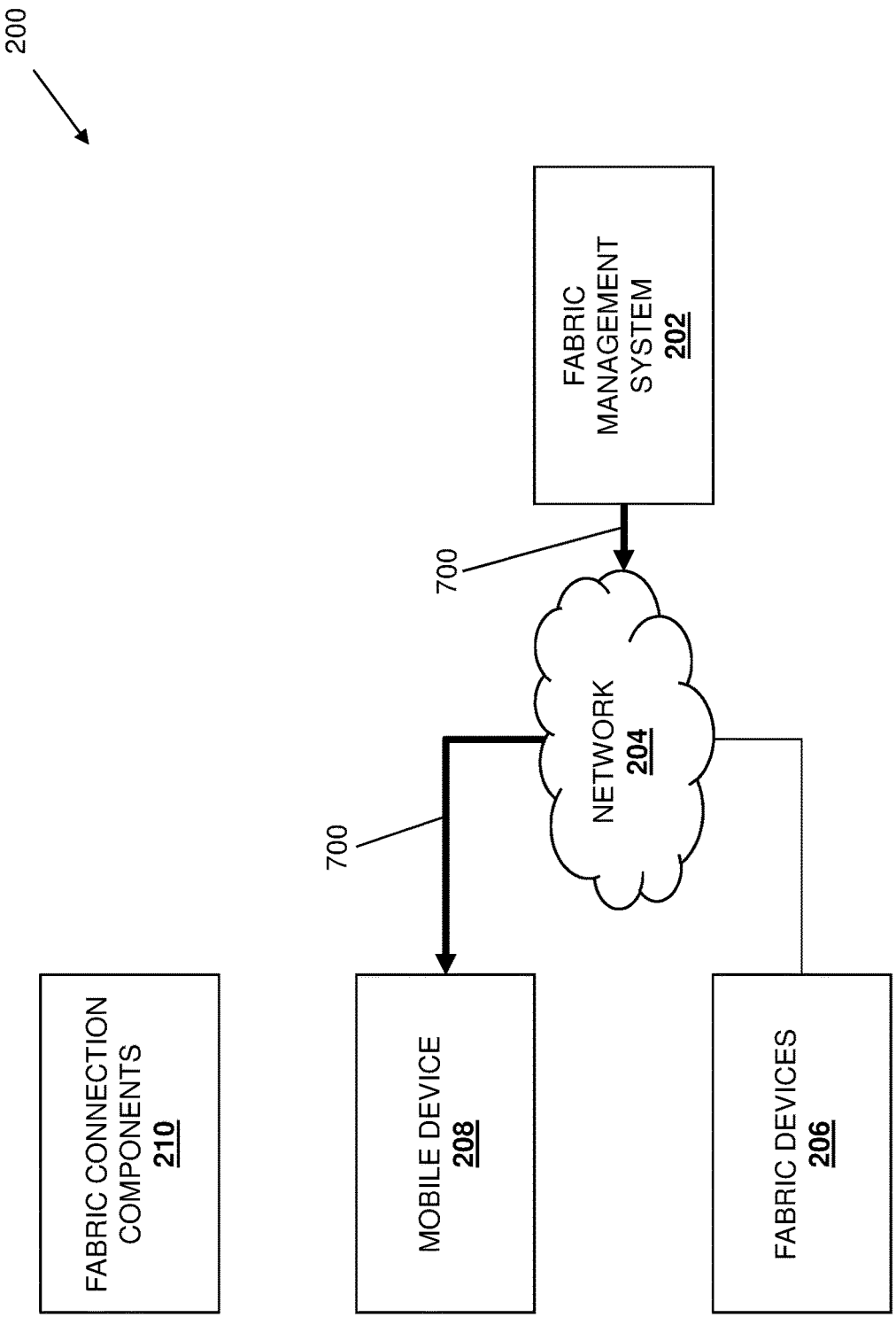

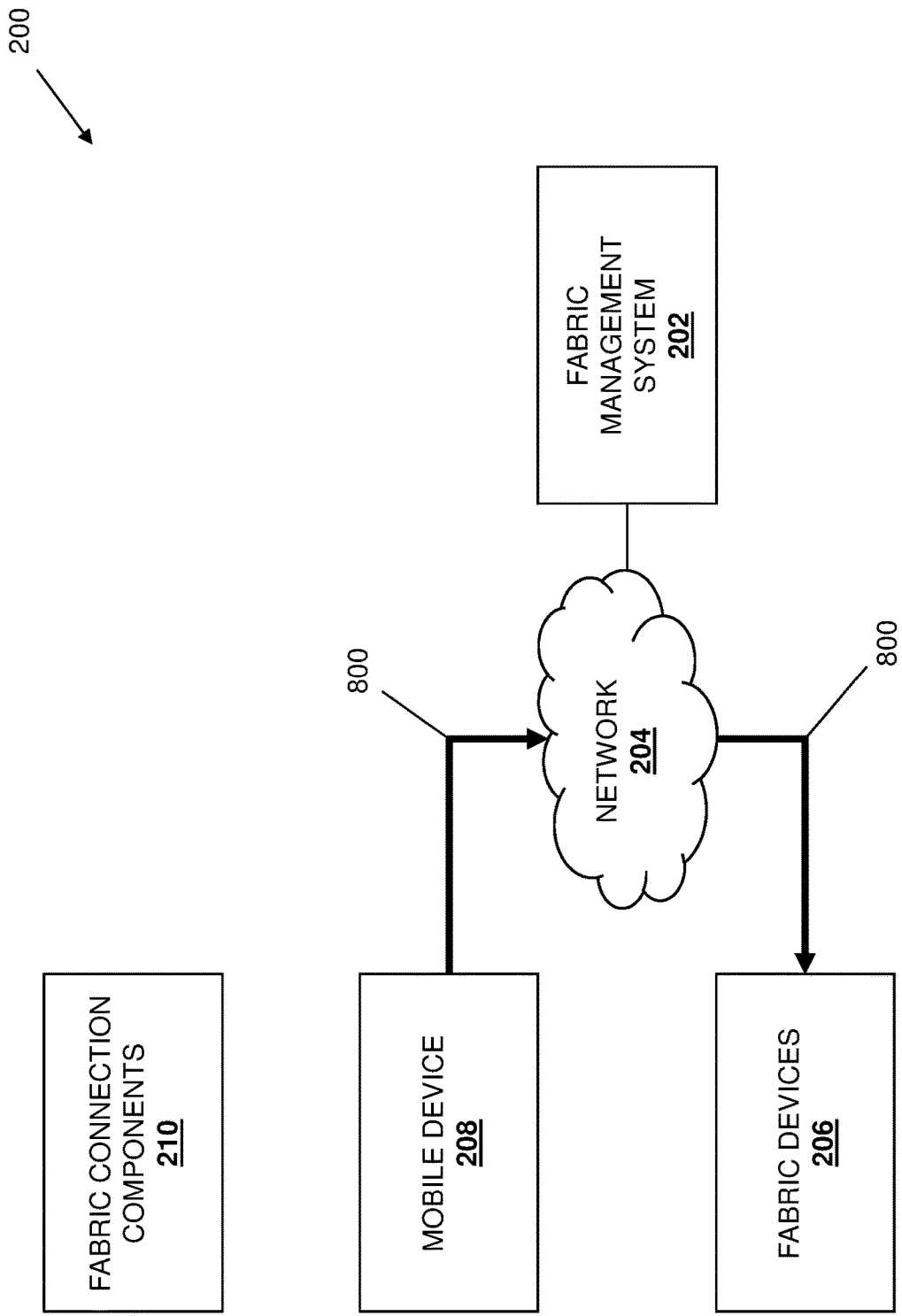

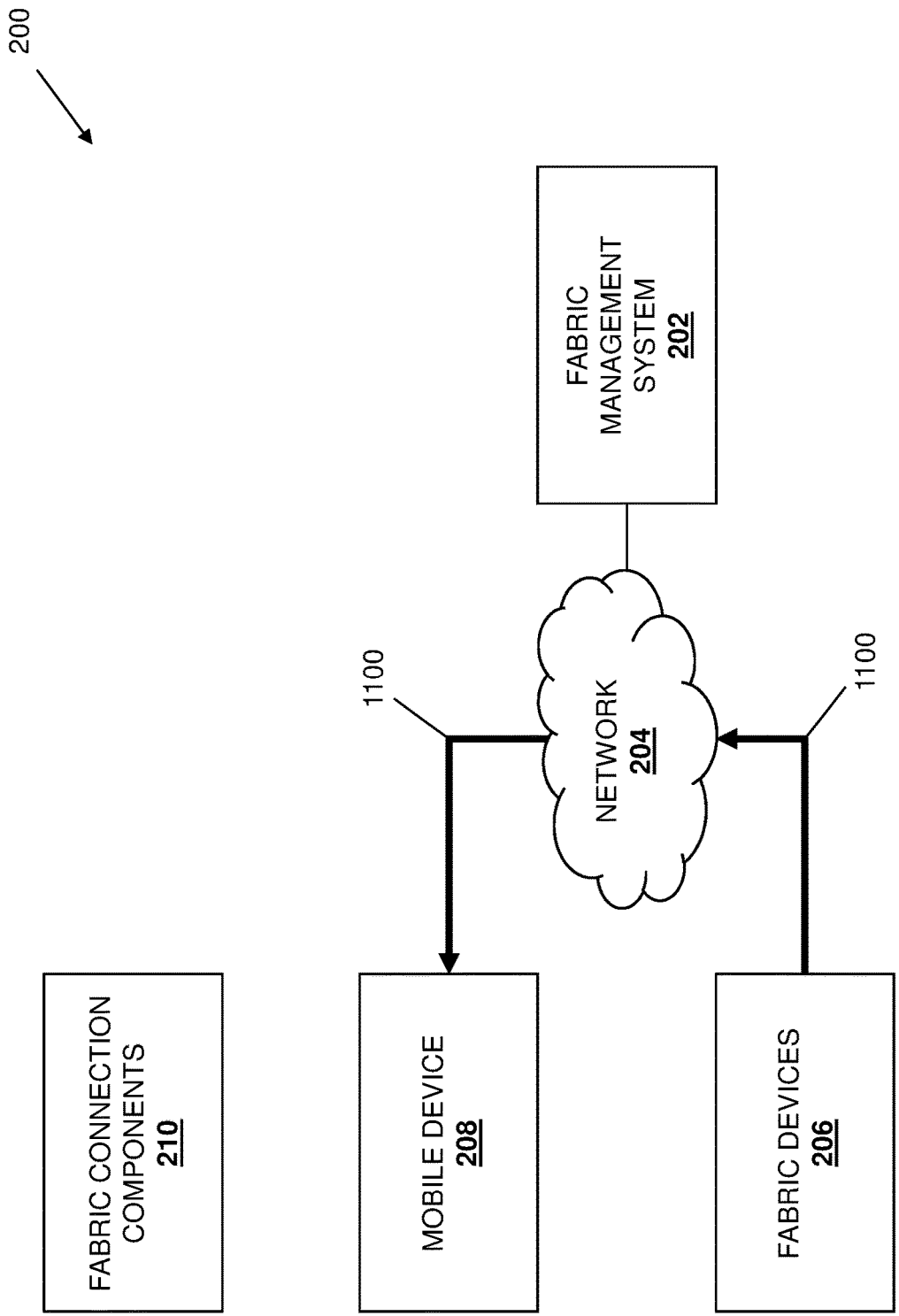

FABRIC CONNECTION ASSIST SYSTEM

BACKGROUND

The present disclosure relates generally to information handling systems, and more particularly to assisting with the physical connections between information handling systems to provide a fabric.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices (e.g., switch devices), server devices, storage system, and/or other computing devices known in the art, may be provided in a fabric in order to allow for the transfer of information between those computing devices. It is desirable to design and deploy/update fabrics as quickly as possible, and several techniques for fabric provisioning have been developed to achieve those goals. For example, fabric management systems such as the Fabric Design Center (FDC) from DELL® Inc. of Round Rock, Tex., United States, automates many of the operations involved in the creation of a complete fabric plan (e.g., switch/server/storage rack placements, configurations, connectivity, cabling details, and/or other fabric information known in the art), and Zero Touch Provisioning (ZTP) techniques automate many of the operations involved in the verification of that fabric plan once the computing device have been connected together. As will be appreciated by one of skill in the art in possession of the present disclosure, the fabric plan discussed above may identify transceiver devices for ports on switch devices (e.g., based on switch/port configurations/capabilities), copper or optical cabling for connecting switch devices to other devices in the fabric (e.g., while considering "breakout" modes, distance between connected peer computing devices, etc.), direct-attach cables (e.g., active or passive Direct-Attach Copper (DAC) cables and/or Active Optical Cables (AOCs)) for connecting switch devices to other devices in the fabric (e.g., while considering "breakout" modes, distance between connected peer computing devices, etc.), and/or other fabric plan information known in the art, and may be utilized to generate a respective "job plan" for each fabric connection technician involved in the connection of the computing devices to provide the fabric.

Those fabric connection technicians may then operate as per their respective job plans to connect the computing devices to provide the fabric, and once those job plans have been carried out by the fabric connection technicians, the fabric connections may be automatically verified (e.g., using Link Layer Discovery Protocol (LLDP) communications and verification scripts). As such, while fabric creation and fabric connection verification are substantially automated, the actual connection of the computing devices in the fabric remains a manual operation. Furthermore, while fabric administrators tend to have relatively extensive knowledge of the computing devices (e.g., Command Line Interface (CLI) operations and other tools that allow for the performance of validation/troubleshooting) and the fabric connection options (e.g., 1G to 400G transceiver devices and corresponding cabling options, direct-attach cabling options, breakout modes, port configurations that may affect link status, etc.), the fabric connection technicians that are relied on to actually physically connect the computing devices to provide the fabric according to their respective job sheets tend to lack that level of knowledge.

In addition, those fabric connection technicians often operate in a time-constrained and physically-constrained environment that presents further challenges with the connection of the computing device in the fabric. For example, the fabric connection component inventory is typically not co-located with the computing device(s) being connected, which requires the fabric connection technician to identify and collect the relevant transceiver devices/corresponding cabling and/or direct-attach cabling (e.g., in a "crash cart") before transporting them to the location of the computing device(s) to-be connected. Furthermore, in some cases, switch devices positioned at the top of a rack may only be accessible via a ladder, while switch device positioned at the bottom of a rack may present difficulties as well. Further still, the ability to accurately identify computing devices, ports, transceiver devices/corresponding cables, direct-attach cabling, and/or other fabric connection components may be difficult due to light pollution, poor lighting, lack of clear/visible information on the computing devices, fabric connection component identifiers (e.g., Quick Response (QR) codes or bar codes) not being accompanied by descriptions, discrepancies between network operating system port number schemes and the port numbering printed on the switch devices, and/or other issues that would be apparent to one of skill in the art in possession of the present disclosure. Yet further still, during the fabric connection process, fabric connection technicians may perform voice calls with fabric administrators while having to carry transceiver devices/corresponding cabling and/or direct-attach cabling, which often precludes the use of relatively large mobile devices (e.g., laptop/notebook computing devices) or tethered devices (e.g., desktop computing devices) that would reduce fabric connection technician agility.

Thus, the manual operations combined with the challenging fabric connection environment makes conventional fabric connection technique error-prone, and may result in links between computing devices not being available due to fabric connection issues. For example, common fabric connection errors include the incorrect selection of direct-attach cabling or a transceiver device and/or corresponding cable, the connection of a correctly selected transceiver device or direct-attach cable in an incorrect port or an incorrect switch device, incorrectly seated direct-attach cabling connectors, transceiver devices, or corresponding cables, switch port/cage issues, faulty direct-attach cabling, transceiver devices, or corresponding cables, configuration mismatches, and/or other fabric connection issues that may then require subsequent fault isolation procedures and further manual intervention by a fabric connection technician or fabric administrator to remedy the issue.

Accordingly, it would be desirable to provide a fabric connection system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a fabric connection assist engine that is configured to: receive, from a fabric management system via a network, first fabric connection information for a first port coupled to the processing system; receive, from a mobile device via the network, an identification of the first port; identify, to the mobile device via the network in response to receiving the identification of the first port, a plurality of fabric connection components that are indicated by the first fabric connection information as being supported by the first port; receive, from the mobile device via the network, an identification of a first fabric connection component that is included in the plurality of fabric connection components that are indicated by the first fabric connection information as being supported by the first port; detect that the first fabric connection component has been connected to the first port; and transmit, to the mobile device via the network in response to detecting the first fabric connection component has been connected to the first port, a first fabric connection component confirmation communication that is configured to display on the mobile device a confirmation of the connection of the first fabric connection component to the first port.

BRIEF DESCRIPTION OF THE DRAWINGS

FIG. 6 is a schematic view illustrating an embodiment of the networked system of FIG. 2 operating during the method of FIG. 5.

FIG. 7 is a schematic view illustrating an embodiment of the networked system of FIG. 2 operating during the method of FIG. 5.

FIG. 8A is a schematic view illustrating an embodiment of the networked system of FIG. 2 operating during the method of FIG. 5.

FIG. 11A is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
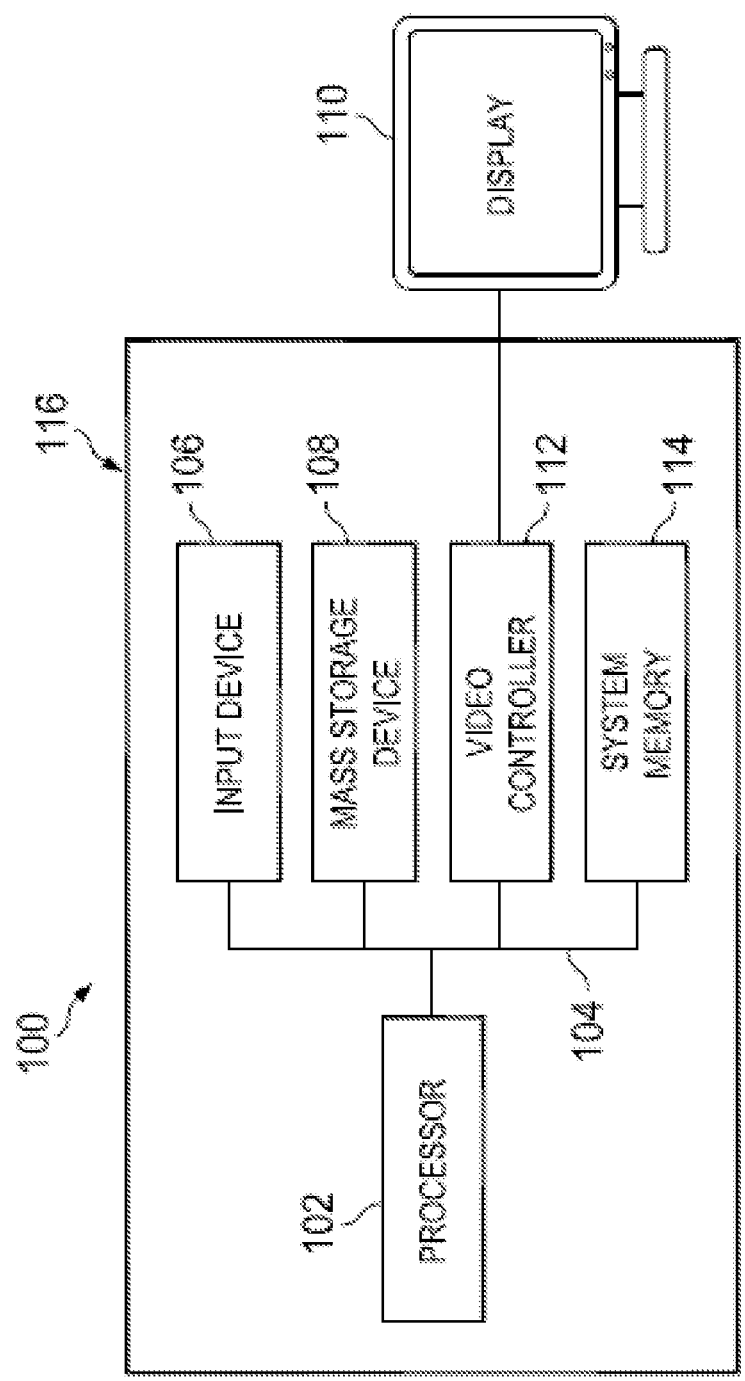
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
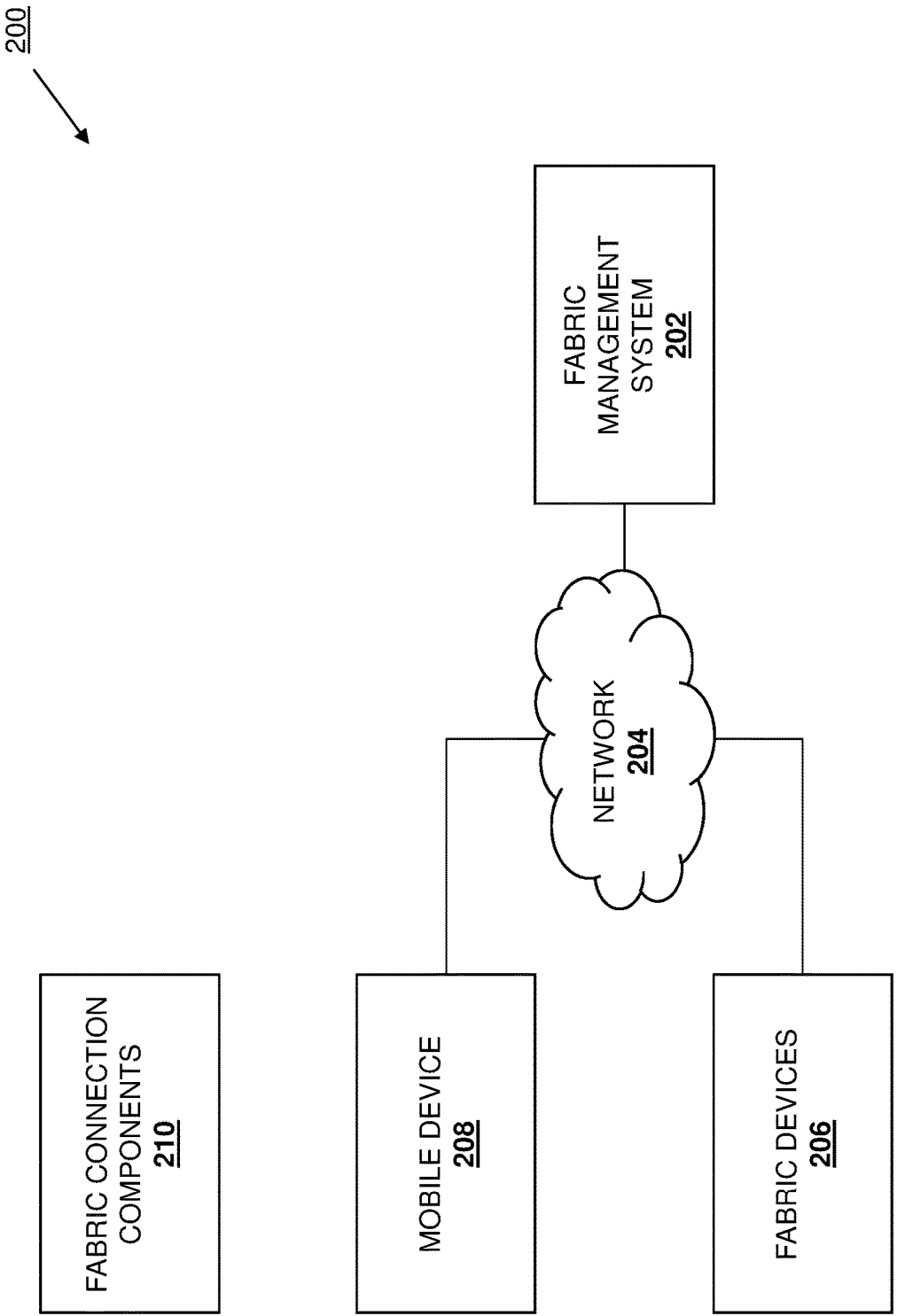
FIG. 2 is a schematic view illustrating an embodiment of a networked system that may utilize the fabric connection assist system of the present disclosure.

Referring now to FIG. 2, an embodiment of a networked system 200 is illustrated. In the illustrated embodiment, the networked system 200 includes a fabric management system 202. In an embodiment, the fabric management system 202 may be provided by the IHS 100 discussed above with reference to FIG. 1, and/or may include some or all of the components of the IHS 100, and in specific examples may be provided by one or more server devices configured with the Fabric Design Center (FDC) from DELL® Inc. of Round Rock, Tex., United States. However, while illustrated and discussed as being provided by server devices configured with particular fabric management software, one of skill in the art in possession of the present disclosure will recognize that fabric management systems provided in the networked system 200 may include any devices configured with any fabric management software that allows for functionality similar to that of the fabric management system 202 discussed below. As illustrated, the fabric management system 202 may be coupled to a network 204 such as, for example, a Local Area Network (LAN), the Internet, combinations thereof, and/or any other network that would be apparent to one of skill in the art in possession of the present disclosure. For example, embodiments below discussed the network 204 as providing a management network, but other types of networks will fall within the scope of the present disclosure as well.

In the illustrated embodiment, a plurality of fabric devices 206 are also coupled to the network 204. In an embodiment, the fabric devices 206 may be provided by the IHS 100 discussed above with reference to FIG. 1, and/or may include some or all of the components of the IHS 100, and in the specific examples below are discussed as being provided by networking devices such as switch devices. However, while illustrated and discussed as being provided by networking devices, one of skill in the art in possession of the present disclosure will recognize that fabric devices provided in the networked system 200 may include other types of devices (e.g., server devices, storage systems, etc.) that are configured to operate similarly as the fabric devices 206 discussed below. In some embodiments, the fabric devices 206 may have been provided in racks in a datacenter and may have been connected to the network 204 (e.g., a management network) in order to allow the utilization of the fabric connection assist system of the present disclosure that assists in the connection of those fabric devices 206 to provide a fabric, although other fabric device connection scenarios will fall within the scope of the present disclosure as well.

In the illustrated embodiment, a mobile device 208 is coupled to the network 204. In an embodiment, the mobile device 208 may be provided by the IHS 100 discussed above with reference to FIG. 1, and/or may include some or all of the components of the IHS 100, and in the specific examples below are discussed as being provided by a mobile phone. However, while illustrated and discussed as being provided by a mobile phone, one of skill in the art in possession of the present disclosure will recognize that mobile devices provided in the networked system 200 may include other types of mobile devices (e.g., tablet computing devices, laptop/notebook computing devices, etc.) that are configured to operate similarly as the mobile device 208 discussed below. Thus, while the inventors of the present disclosure have recognized particular benefits associated with the use of mobile phones as the mobile devices of the present disclosure, other mobile device (e.g., tablet computing devices, laptop/notebook computing devices, etc.) may be utilized while remaining within the scope of the present disclosure as well. Furthermore, while only a single mobile device 208 is illustrated and discussed in detail below, one of skill in the art in possession of the present disclosure will recognize that multiple mobile devices (e.g., operating similarly to the mobile device 208) may be provided in the networked system 200 (e.g., as well as provided to each fabric connection technician operating to connect the fabric devices 206 to provide the fabric discussed below) while remaining within the scope of the present disclosure as well.

In the illustrated embodiment, the networked system 200 may also include fabric connection components 210 such as the transceiver devices/corresponding cabling, direct-attach cabling, and/or any other fabric connection components discussed below. For example, the fabric connection components 210 may be included in a fabric connection component inventory, and/or may be moved from the fabric connection component inventory to a mobile "crash cart" by a fabric connection technician in order to allow those fabric connection components 210 to be co-located along with the fabric connection technician when performing the fabric connection operations discussed below. However, while a specific networked system 200 has been illustrated and described, one of skill in the art in possession of the present disclosure will recognize that the fabric connection assist system of the present disclosure may include a variety of components and component configurations while remaining within the scope of the present disclosure as well.

Figure 3:
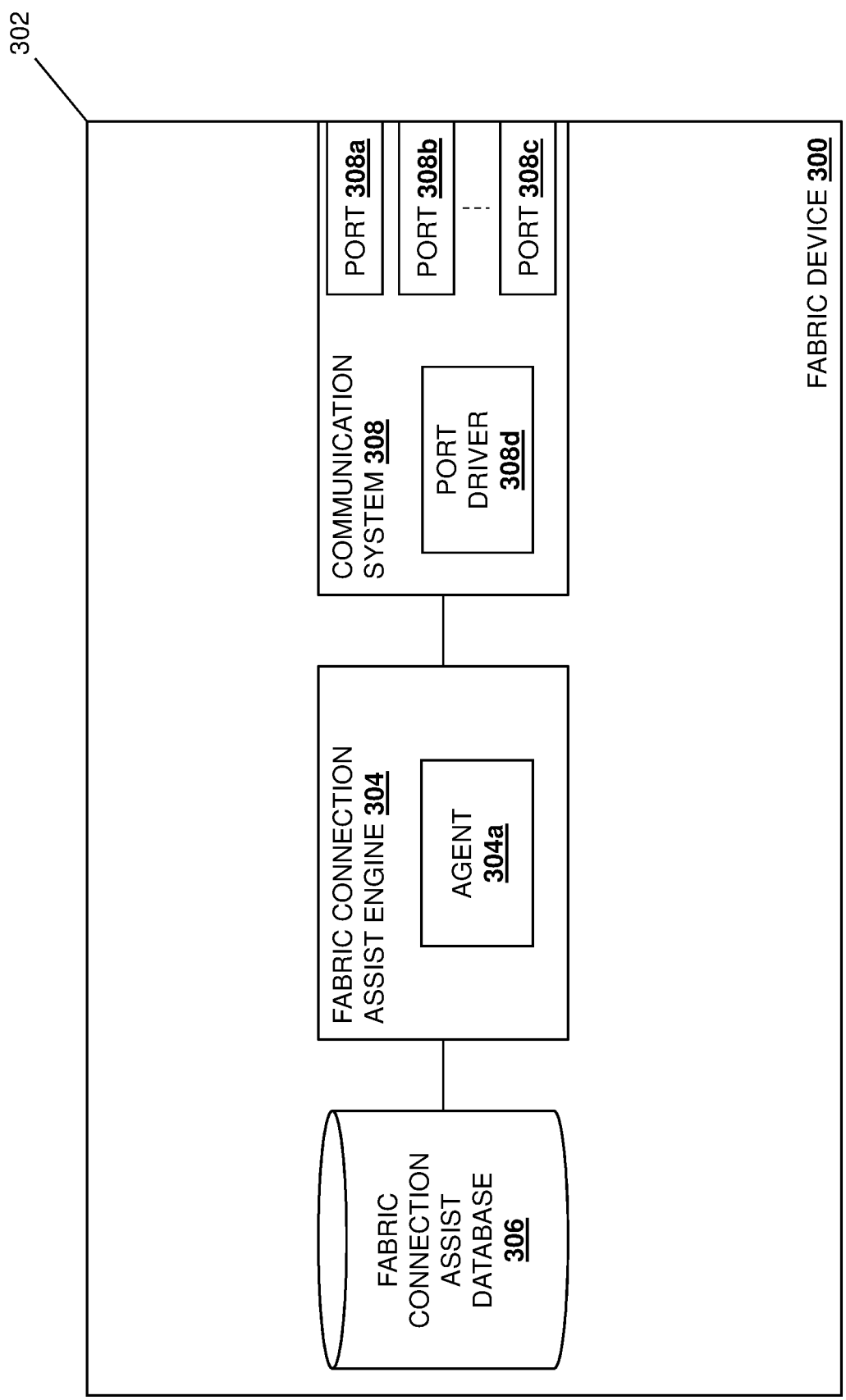
FIG. 3 is a schematic view illustrating an embodiment of a fabric device that may be provided in the networked system of FIG. 2.

Referring now to FIG. 3, an embodiment of a fabric device 300 is illustrated that may provide any of the fabric devices 206 discussed above with reference to FIG. 2. As such, the fabric device 300 may be provided by the IHS 100 discussed above with reference to FIG. 1 and/or may include some or all of the components of the IHS 100, and in the specific examples discussed below is described as being provided by a networking device such as a switch device. However, while illustrated and discussed as being provided by a networking device, one of skill in the art in possession of the present disclosure will recognize that the functionality of the fabric device 300 discussed below may be provided by other devices (e.g., server devices, storage systems, etc.) that are configured to operate similarly as the fabric device 300 discussed below. In the illustrated embodiment, the fabric device 300 includes a chassis 302 that houses the components of the fabric device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a fabric connection assist engine 304 that is configured to perform the functionality of the fabric connection assist engines and/or fabric devices discussed below. In the specific examples below, the fabric connection assist engine 304 may include a fabric connection assist agent 304a that performs some or all of the functionality of the fabric connection assist engine 304, although one of skill in the art in possession of the present disclosure will appreciate that the functionality of the fabric connection assist engine 304 may be provided in a variety of manners that will fall within the scope of the present disclosure as well.

The chassis 302 may also house a storage system (not illustrated, but which may include the storage 108 discussed above with reference to FIG. 1) that is coupled to the fabric connection assist engine 304 (e.g., via a coupling between the storage system and the processing system) and that includes a fabric connection assist database 306 that is configured to store any of the information utilized by the fabric connection assist engine 304 discussed below. The chassis 302 may also house a communication system 308 that is coupled to the fabric connection assist engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In the illustrated embodiment, the communication system 308 includes a plurality of ports 308a, 308b, and up to 308c, as well as a port driver 308d.

As will be appreciated by one of skill in the art in possession of the present disclosure, one of the ports 308a-308c may include a management port that connects to a management network provided by the network 204 (a connection which may be provided by physically placing the fabric device 300 in a datacenter and connecting that port to the management network) in order to enable the management communications utilized with the fabric connection assist system of the present disclosure, although other techniques for allowing the fabric connection assist functionality described below (e.g., providing the fabric connection information on the fabric device 300 without the network connection) will fall within the scope of the present disclosure as well. However, while a specific fabric device 300 has been illustrated and described, one of skill in the art in possession of the present disclosure will recognize that fabric devices (or other devices operating according to the teachings of the present disclosure in a manner similar to that described below for the fabric device 300) may include a variety of components and/or component configurations for providing conventional fabric device functionality, as well as the functionality discussed below, while remaining within the scope of the present disclosure as well.

Figure 4:
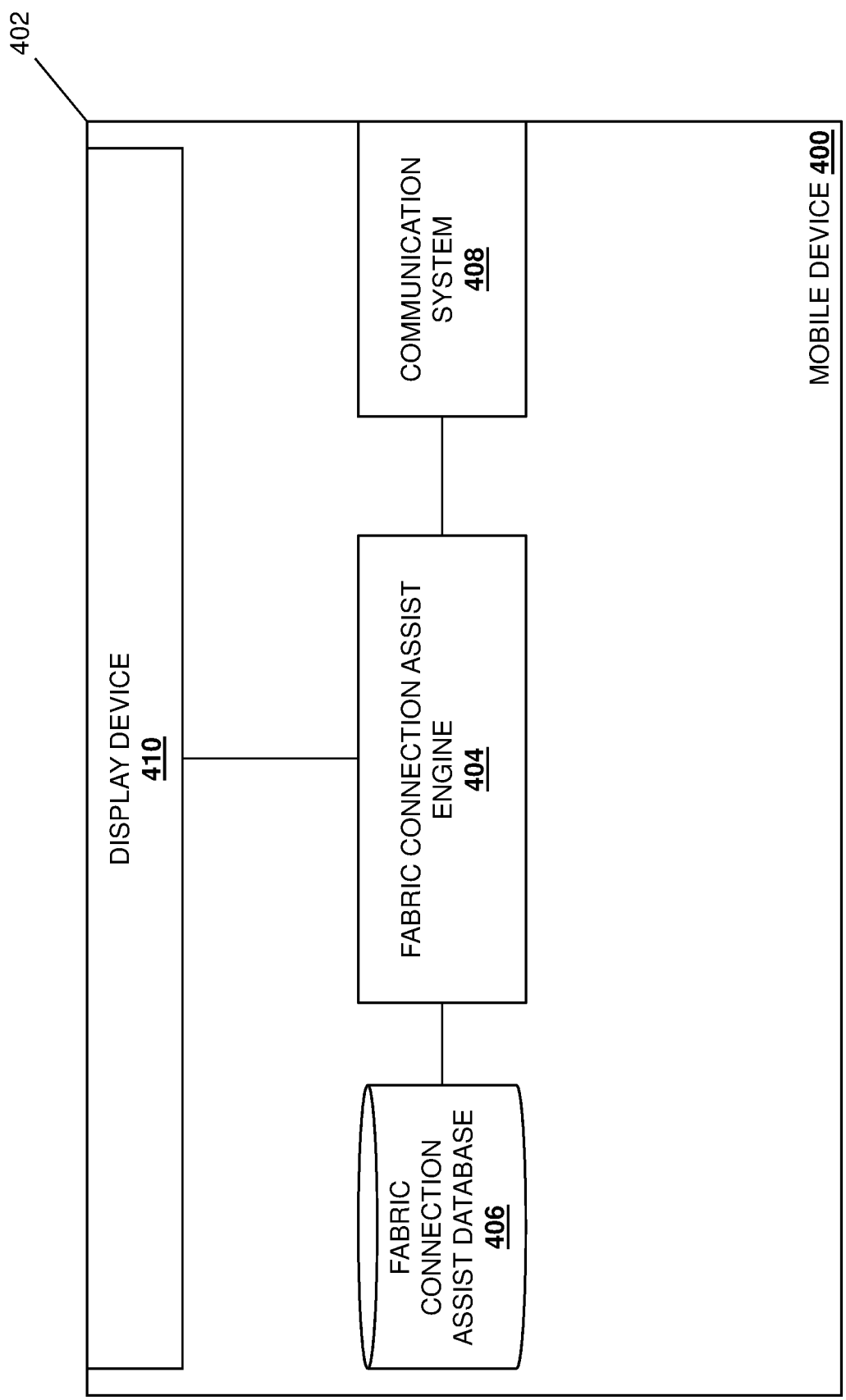
FIG. 4 is a schematic view illustrating an embodiment of a mobile device that may be provided in the networked system of FIG. 2.

Referring now to FIG. 4, an embodiment of a mobile device 400 is illustrated that may provide the mobile device 208 discussed above with reference to FIG. 2. As such, the mobile device 400 may be provided by the IHS 100 discussed above with reference to FIG. 1 and/or may include some or all of the components of the IHS 100, and in the specific examples discussed below is described as being provided by a mobile phone. However, while illustrated and discussed as being provided by a mobile phone, one of skill in the art in possession of the present disclosure will recognize that the functionality of the mobile device 400 discussed below may be provided by other devices (e.g., tablet computing devices, laptop/notebook computing devices, etc.) that are configured to operate similarly as the mobile device 400 discussed below. In the illustrated embodiment, the mobile device 400 includes a chassis 402 that houses the components of the mobile device 400, only some of which are illustrated and discussed below.

For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a fabric connection assist engine 404 that is configured to perform the functionality of the fabric connection assist engines and/or mobile devices to provide the fabric connection assist application discussed below. In the specific examples below, the fabric connection assist engine 404 may provide a fabric connection assist application on the mobile device 400 that performs some or all of the functionality of the fabric connection assist engine 404, although one of skill in the art in possession of the present disclosure will appreciate that the functionality of the fabric connection assist engine 404 may be provided in a variety of manners that will fall within the scope of the present disclosure as well.

The chassis 402 may also house a storage system (not illustrated, but which may include the storage 108 discussed above with reference to FIG. 1) that is coupled to the fabric connection assist engine 404 (e.g., via a coupling between the storage system and the processing system) and that includes a fabric connection assist database 406 that is configured to store any of the information utilized by the fabric connection assist engine 404 discussed below. The chassis 402 may also house a communication system 408 that is coupled to the fabric connection assist engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 408 may provide for the connection (e.g., a wireless connection such as a WiFi connection) of the mobile device 400 to a management network provided by the network 204.

The chassis 402 may also house a display device 410 (e.g., the display 110 discussed above with reference to FIG. 1) that is coupled to the fabric connection assist engine 404 (e.g., via a coupling between the display device 410 and the processing system) and that is configured to display any of the information illustrated and discussed below. However, while a specific mobile device 400 has been illustrated and described, one of skill in the art in possession of the present disclosure will recognize that mobile devices (or other devices operating according to the teachings of the present disclosure in a manner similar to that described below for the mobile device 400) may include a variety of components and/or component configurations for providing conventional mobile device functionality, as well as the functionality discussed below, while remaining within the scope of the present disclosure as well.

Figure 5:
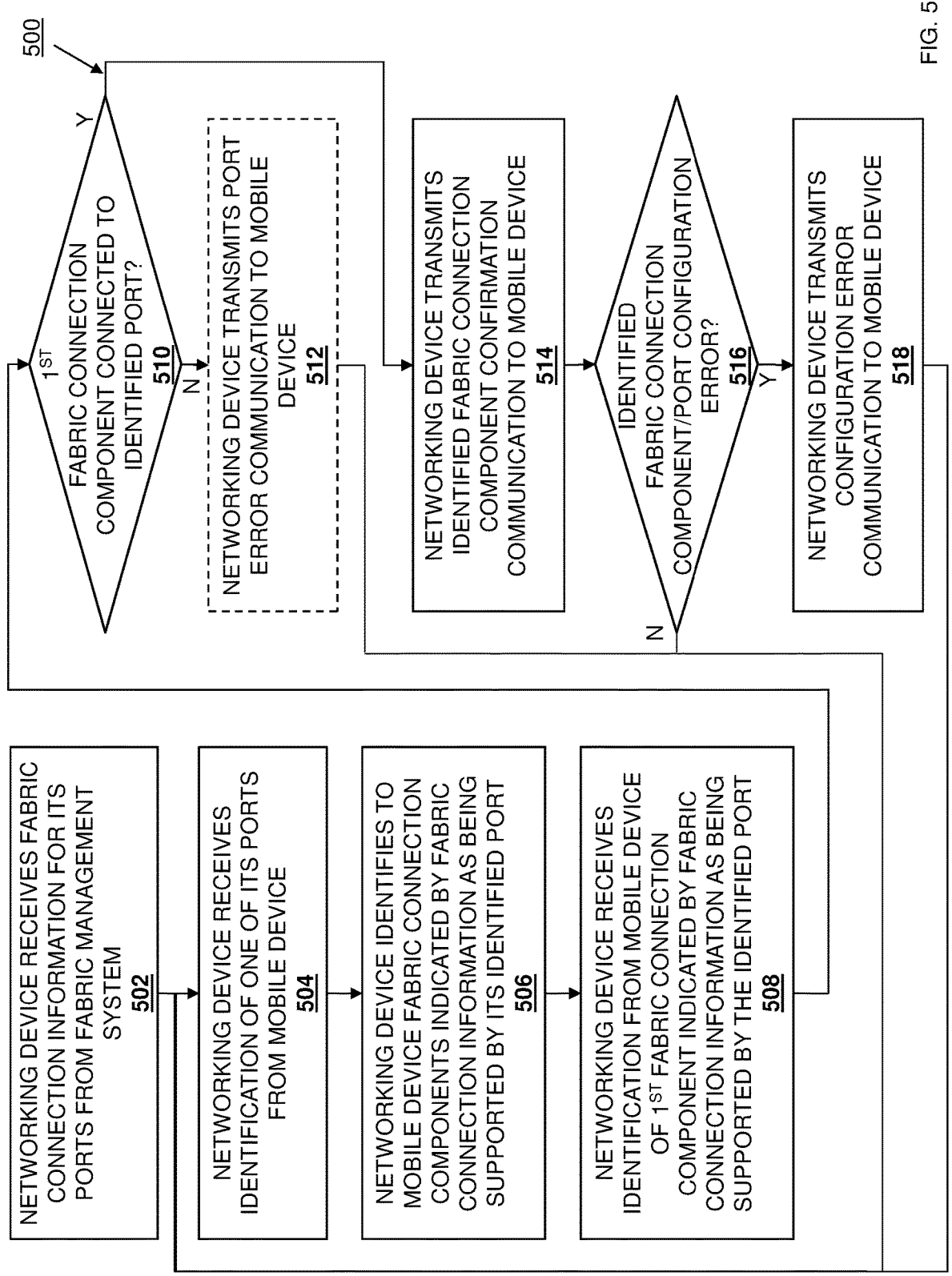
FIG. 5 is a flow chart illustrating an embodiment of a method for assisting with the connection of a fabric.

Referring now to FIG. 5, an embodiment of a method 500 for assisting with the connection of a fabric is illustrated. As discussed below, the systems and methods of the present disclosure provide for the communication between fabric devices that are being connected to a fabric and a mobile device utilized by a fabric connection technician in order to inform the fabric connection technician a variety of information about fabric connection components for use in providing that fabric connection, and provide a feedback loop that indicates when a desired fabric connection has been achieved. For example, the fabric connection assist system of the present disclosure may include a networking device coupled to a fabric management system and a mobile device via a network. The networking device receives first fabric connection information for its first port from the fabric management system. When the mobile device subsequently identifies the first port to the networking device, the networking device identifies fabric connection components to the mobile device that are indicated by the first fabric connection information as being supported by the first port. When the mobile device subsequently identifies a first of the fabric connection components to the networking device, and the networking device then detects that the first fabric connection component has been connected to the first port, the networking device transmits a first fabric connection component confirmation communication to the mobile device that is configured to display a confirmation on the mobile device of the connection of the first fabric connection component to the first port. As such, fabric connection technicians may be assisted via their mobile device throughout the connection of the networking device to the fabric, with a feedback loop providing an indication when a desired fabric connection for the networking device has been provided, thus reducing errors in the connection of fabric devices to the fabric.

The method 500 begins at block 502 where a networking device receives fabric connection information for its ports from a fabric management system. As discussed above, during or prior to the method 500, the fabric devices 206 may be "racked", which may include positioning the fabric devices 206 in desired locations and connected those fabric devices to a management network. In the examples below, the fabric management system 202 (e.g., the FDC provided by DELL® Inc. of Round Rock, Tex., United States) may be utilized by a network administrator to generate a fabric plan that includes the fabric devices 206, and that fabric plan may detail the positioning of each of the fabric devices in particular rack locations in racks in a datacenter. As such, prior to block 502, each of the fabric devices 206 may be positioned in racks as detailed in the fabric plan, and connected to a management network provided by the network 204 (e.g., via a management port on that fabric device 206). Furthermore, one of skill in the art in possession of the present disclosure will recognize that the fabric plan may detail how high in a rack a fabric device 206 is located, the distance between connected fabric devices 206, etc. However, while particular techniques have been described for positioning the fabric devices 206 in a manner that allows their connection to provide a fabric, one of skill in the art in possession of the present disclosure will appreciate how other techniques may be utilized to prepare the fabric devices 206 for connection to provide the fabric while remaining within the scope of the present disclosure as well.

With reference to FIG. 6, in an embodiment of block 502, the fabric management system 202 may perform fabric connection information transmission operations 600 that include generating and transmitting fabric connection information via the network 204 to the fabric connection devices 206. For example, the fabric management system 202 may generate fabric connection information for the ports on the fabric devices 206, and may transmit that fabric connection information via the network 204 to the fabric devices 206. As such, the fabric connection assist engine 304 in the fabric devices 206/300 may receive that fabric connection information via their communication systems 308, and may store that fabric connection information in their fabric connection assist databases 306. As discussed above, the fabric management system 202 (e.g., the FDC provided by DELL® Inc. of Round Rock, Tex., United States) may be utilized by a network administrator to generate a fabric plan that includes the fabric devices 206 and, in addition to detailing the physical positioning of the fabric devices 206, that fabric plan may include start configurations for the fabric devices 206, port configurations for the fabric devices 206, fabric connection components such as transceiver devices or direct-attach cabling supported by each port on the fabric devices 206 that will be connected as part of the fabric, cabling options for fabric devices that will be connected as part of the fabric via transceiver devices, and/or any other fabric connection information that one of skill in the art in possession of the present disclosure will recognize as being generated as part of a fabric plan by a fabric management system. For example, the fabric plan may detail transceiver device compatibility for any port, preferred transceiver device vendors for any port, direct-attach cabling compatibility for any port, preferred direct-attach cabling vendors for any port, and/or any other port-specific information that would be apparent to one of skill in the art in possession of the present disclosure.

In a specific example, the fabric connection information transmitted by the fabric management system 202 to the fabric devices 206 may identify transceiver devices or direct-attach cables supported by each port on those fabric devices 206 that will be connected as part of the fabric by identifying supported transceiver devices/direct-attach cables (e.g., via their part numbers in the examples below), supported transceiver device types or direct-attach cable types (e.g., via their features such as data transmission medium, data transmission speed, data transmission range, etc.), and/or any other transceiver device information or direct-attach cable information that would be apparent to one of skill in the art in possession of the present disclosure. In the specific example provided below, the fabric connection information provided to the fabric device 206 identifies four fabric connection components (direct-attach cables and transceiver devices) for a port "15" on that fabric device 206, and ranks them as follows:

| 1. DAC-QSFP28-100G-2M | 76V43 |
| 2. AOC-QSFP28-100G-3M | 05J8P |
| 3. Q28-100G-SR4-NOF | 14NV5 |
| 4. Q28-100G-SR4 | ANY |

As will be appreciated by one of skill in the art in possession of the present disclosure, the fabric connection information in the example above prioritizes a Direct-Attach Copper (DAC) Quad Small Form-factor Pluggable 28 (QSFP28) direct-attach cable that is configured to operate at 100 Gbps and transmit at ranges of 2 meters (of passive copper cable) with a part number "76V43", followed by an Active Optical Cable (AOC) QSFP28 direct-attach cable that is configured to operate at 100 Gbps and transmit at ranges of 3 meters with a part number "05J8P", followed by a QSFP28 Short-Range-4 (SR4) optical transceiver device (with no FEC capabilities (e.g., "NOF") that is configured to operate at 100 Gbps and with a part number "14NV5", followed by QSFP28 SR4 transceiver devices that are configured to operate at 100 Gbps and with any part number. However, while a few specific direct-attach cables and transceiver devices are described as being ranked and identified for a particular port on a particular fabric device 206, one of skill in the art in possession of the present disclosure will appreciate how direct-attach cables and transceiver devices supported by a port may be identified in a variety of manners that will fall within the scope of the present disclosure as well. For example, direct-attach cables and transceiver devices manufactured by preferred vendors may be ranked higher for ports relative to direct-attach cables and transceiver devices manufactured by non-preferred vendors.

In addition, the fabric connection information provided to the fabric device 206 at block 502 may identify one or more cabling option for connecting that fabric device 206 to another fabric device 206 via transceiver devices. In the specific example below, the fabric connection information provided to the fabric device 206 at block 502 identifies an Optical Multi-Mode 3 or 4 (OM3/OM4) fiber cable for connecting that fabric device 206 to another fabric device 206 via transceiver devices, although one of skill in the art in possession of the present disclosure will appreciate that the identification of other cabling/cabling information will fall within the scope of the present disclosure as well. For example, the fabric plan generated by the fabric management system 202 may include the distances between fabric devices 206 that will be connected together, and thus cabling options may identify the type of cabling needed to connect fabric devices 206, the length of cabling needed to connect fabric devices 206, and/or any other cabling information that would be apparent to one of skill in the art in possession of the present disclosure.

Thus, at block 502, the fabric connection assist agent 304a in the fabric connection assist engine 304 in each of the fabric devices 206/300 may receive the fabric connection information from the port driver 208d in the communication system 308 of that fabric device 206/300 and, in response, may associate each port 308a-308c in that communication system 308 with the supported transceiver devices and corresponding cabling options, direct-attach cabling, and/or other fabric connection information that was provided for that port. In the examples below, a single fabric device 206 is discussed as having a single one of its ports connected to a fabric using the fabric connection assist system of the present disclosure, but one of skill in the art in possession of the present disclosure will appreciate how any fabric device 206 in the networked system 200 may have its ports connected to the fabric in a similar manner while remaining within the scope of the present disclosure as well.

The method 500 then proceeds to block 504 where the networking device receives an identification of one of its ports from a mobile device. With reference to FIG. 7, the fabric connection assist engine 404 (e.g., a fabric connection assist application provided by the fabric connection assist engine 404) may be launched on the mobile device 208/400 and, in response, may perform fabric plan information retrieval operations 700 that include retrieving fabric plan information via the network 204 from the fabric management system 202. For example, the fabric management system 202 may have generated a job plan that includes fabric plan information and that corresponds to the fabric connections between the fabric devices that should be performed by a fabric connection technician associated with the mobile device 208 and, in response, may transmit that job plan via the network 204 to the mobile devices 208 when requested by the fabric connection assist engine 404. In a specific example, the fabric plan information may identify the ports on any fabric device 206 that should be connected to the port on any other fabric device 206 in order to provide the fabric, as well as any other fabric plan information that would be apparent to one of skill in the art in possession of the present disclosure. As such, the fabric connection assist engine 404 in the mobile device 208/400 may retrieve that fabric plan information via its communication system 408, and may store that fabric plan information in its fabric connection assist database 406.

As will be appreciated by one of skill in the art in possession of the present disclosure, the fabric connection operations for a datacenter may require multiple fabric technicians, and thus fabric plan information retrieval operations similar to the fabric plan information retrieval operations 700 discussed above may be performed by other mobile devices in the networked system 200, with the fabric plan information/job plan retrieved by each of those mobile devices providing for a subset of fabric connections between the fabric devices 206 that are required to provide the fabric. As such, at block 504, one or more mobile devices may store fabric plan information that details fabric connections between ports on the fabric devices 206, while the fabric devices 206 may store fabric connection information that details the fabric connection components (e.g., transceiver devices/corresponding cabling and/or direct-attach cabling in the examples below) that may be utilized to provide those fabric connections.

With reference to FIG. 8A, in an embodiment of block 504, the fabric connection assist engine 404 in the mobile device 208/400 may utilize its fabric plan information to identify a port on a fabric device 206 (e.g., port "15" on switch device "Z9264F-ON-01" in rack "5B" in the specific example provided below, which may be provided as part of a networking switch platform with 64 ports of QSFP28 in a two rack unit (2RU) switch chassis) that the fabric connection technician should connect to the fabric, and one of skill in the art in possession of the present disclosure will appreciate how the fabric connection assist engine 404 may utilize the fabric plan information/job plan provided to the mobile device 208 to prioritize the connection of ports on fabric devices 206 detailed in that fabric plan information/job plan in order to guide the fabric connection technician through the fabric connections discussed below in an efficient manner. In response to identifying a port for connection to the fabric, the fabric connection assist engine 404 in the mobile device 208/400 may perform fabric connection session establishment operations with the fabric device 206 that includes that port. For example, the fabric connection assist application provided by the fabric connection assistant engine 404 in the mobile device 208/400 may communicate via the network 204 (e.g., the management network discussed above) with the fabric connection assist agent 304a in the fabric connection assist engine 304 in the fabric device 300 to establish a fabric connection session with that fabric connection assist agent 304a.

The fabric connection assist application provided by the fabric connection assistant engine 404 in the mobile device 208/400 may then perform port identification operations 800 through the network 204 via its communication system 408 with the fabric device 206/300 that includes the port currently being connected to the fabric, and those port identification operations 800 may include identifying the port (e.g., port "15" in the examples herein) on that fabric device 206 that is currently being connected to the fabric. As such, the fabric connection assist engine 304 in the fabric device 206/300 that includes the port currently being connected to the fabric may receive the identification of the port (e.g., port "15" in the examples herein) from the mobile device 208 via its communication system 308. In some embodiments, the fabric connection assist engine 304 in the fabric device 206/300 may then cause a Light Emitting Device (LED) or other visual indicator associated with that port to illuminate in order to indicate that port is currently being connected to the fabric.

Figure 8B:
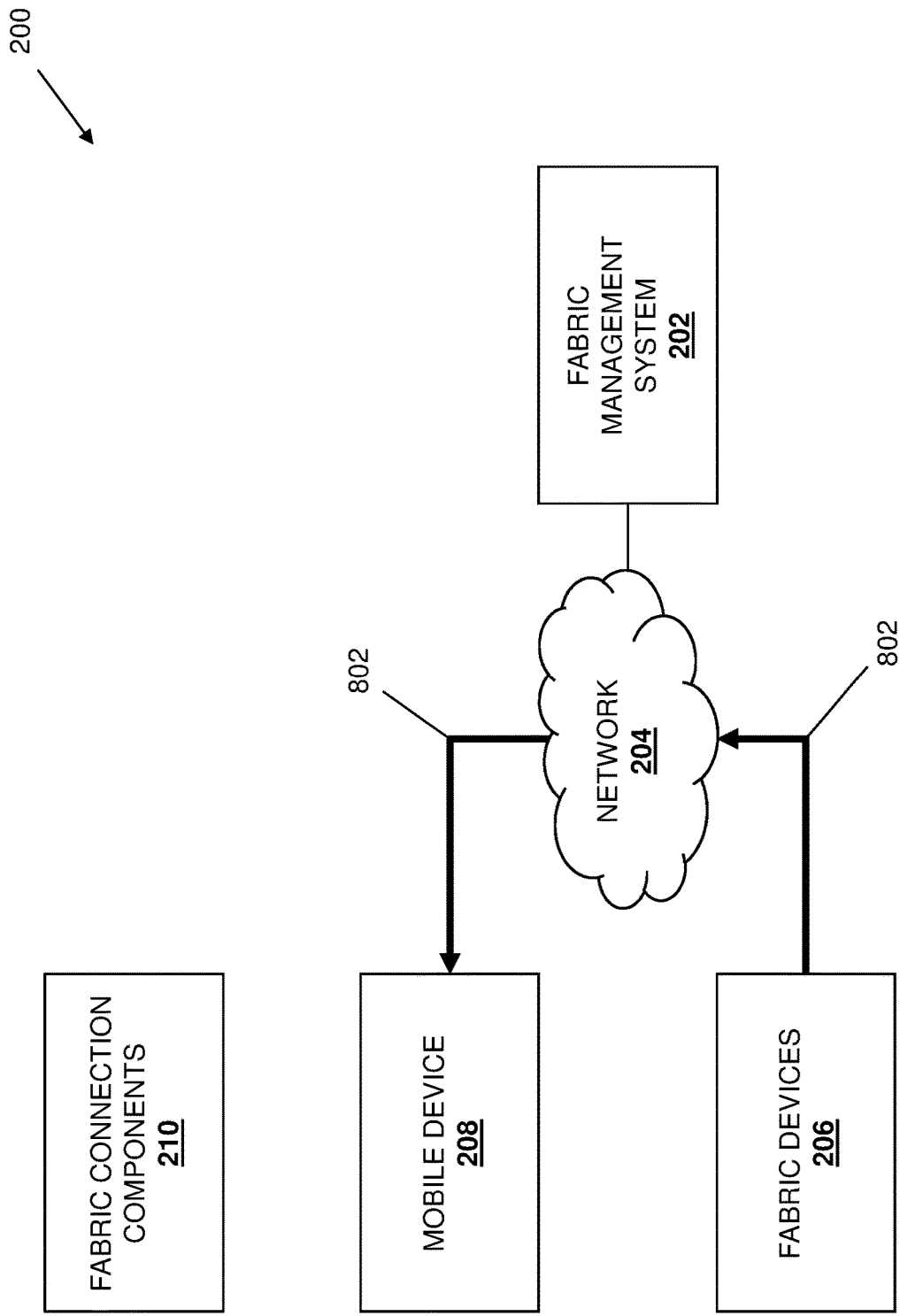
FIG. 8B is a schematic view illustrating an embodiment of the networked system of FIG. 2 operating during the method of FIG. 5.

The method 500 then proceeds to block 506 where the networking device identifies to the mobile device fabric connection components that are indicated by the fabric connection information as being supported by its identified port. With reference to FIG. 8B, in an embodiment of block 506, the fabric connection assist engine 304 in the fabric device 206/300 that includes the port currently being connected to the fabric may perform fabric connection component identification operations 802 that include using the fabric connection information in its fabric connection assist database 306 to determine the transceiver device(s) and/or direct-attach cabling that is supported by its port that is currently being connected to the fabric, and transmitting a fabric connection component identification communication via its communication system 308 and through the network 204 to the mobile device 208 that identifies those transceiver device(s) and/or direct-attach cabling. In addition, the fabric connection assist agent 304a in the fabric connection assist engine 304 in the fabric device 300 may communicate with the fabric connection assist application provided by the fabric connection assistant engine 404 in the mobile device 208/400 via the network 204 (e.g., the management network discussed above) to identify port configuration information (e.g., port speed information, port auto-negotiation information, port Forward Error Correction (FEC) information, and/or any other information about its port that is currently being connected to the fabric).

As such, the fabric connection assist engine 404 in the mobile device 208/400 may receive the identification of the transceiver device(s) and/or direct-attach cabling supported by the port currently being connected to the fabric from the fabric device 206 (along with port configuration information in some embodiments) via its communication system 408. As discussed below, the fabric connection component identification operations 802 may also include the fabric connection assist engine 304 in the fabric device 300 using the fabric connection information in its fabric connection assist database 306 to determine the cabling options and/or other fabric connection components for its port that is currently being connected to the fabric, and transmitting identifying those cabling options and/or other fabric connection components in the fabric connection component identification communication transmitted via its communication system 308 and through the network 204 to the mobile device 208 while remaining within the scope of the present disclosure as well.

Figure 8C:
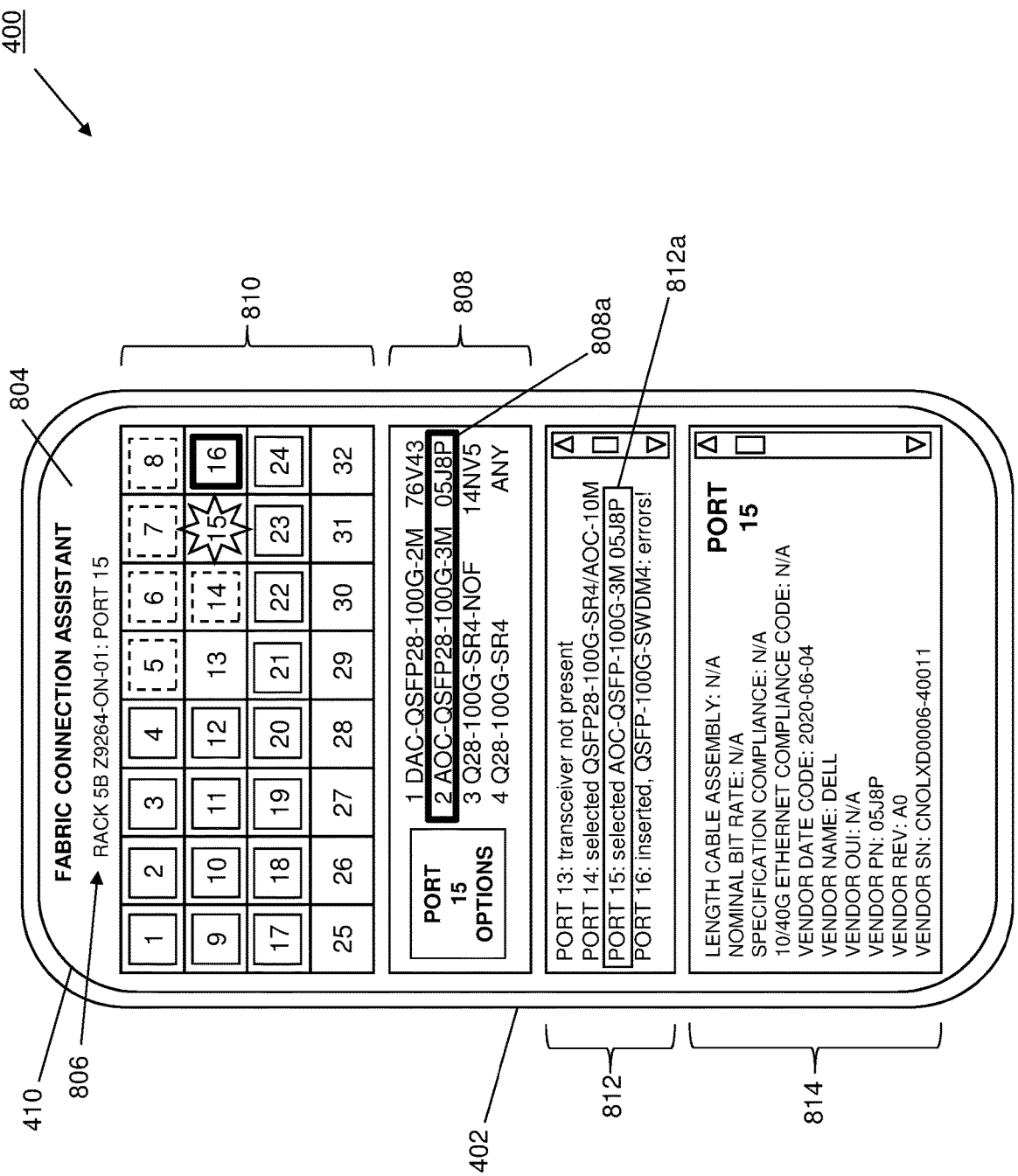
FIG. 8C is a schematic view illustrating an embodiment of the mobile device of FIG. 4 operating during the method of FIG. 5.

With reference to FIG. 8C, in an embodiment of block 504, the fabric connection assist engine 404 in the mobile device 208/400 may utilize the fabric plan information received from the fabric management system 202 to provide a fabric connection assist screen 804 on its display device 410. In the embodiment illustrated in FIG. 8C, the fabric connection assist screen 804 includes a fabric device connection operation identifier 806 that identifies a port on a fabric device 206 (e.g., port "15" on switch device "Z9294F-ON-01" in rack "5B" in the specific example of FIG. 8C that the fabric connection technician should connect to the fabric and, as discussed above, the fabric connection assist engine 404 may utilize the fabric plan information/job plan provided to the mobile device 208 to prioritize the connection of ports on fabric devices 206 detailed in that fabric plan information/job plan in order to guide the fabric connection technician through fabric connections in an efficient manner.

As such, subsequent to the launching of the fabric connection assistant engine 404 on the mobile device 208/400 and the retrieving of the fabric plan information from the fabric management system 202, the fabric connection assist screen 804 may include the current port identifier 806 that identifies the port on the fabric device 206 that should currently be connected to the fabric (e.g., port "15" on switch device "ZMS21-0101-0601-03T0" in rack "5B"), which one of skill in the art in possession of the present disclosure will recognize allows the fabric connection technician to identify the port on the fabric device 206 that they should currently be connect to the fabric. Furthermore, subsequent to receiving the fabric connection component identification communication from the fabric device 206 that includes the port that is currently being connected to the fabric, the fabric connection assist screen 804 may display a supported fabric connection component section 808 that displays identifications for each fabric connection component identified in the fabric connection component identification communication provided for the port currently being connected to the fabric. As illustrated in FIG. 8C and discussed in further detail below, the supported fabric connection component section 808 may be configured to provide an identified fabric connection component indicator 808a to indicate a fabric connection component (e.g., a direct-attach cable in the illustrated example) that has been identified for connection to the port that is currently being connected to the fabric.

In the illustrated embodiment, the fabric connection assist screen 804 also includes a port connection status section 810 that identifies the ports (e.g., port identifiers 1-32) on the fabric device 206 that includes the port that is currently being connected to the fabric, and includes port status indicators that indicate the status of the connection of each of the ports on that fabric device 206 to the fabric. In the illustrated example, each of the port identifiers 1-4, 9-12, and 17-24 includes a first indication (illustrated by a solid box, but which may be provided by a particular color (e.g., green)) that indicates to the fabric connection technician that the ports associated with those port identifiers have been successfully connected to an identified fabric connection component (discussed in further detail below). Furthermore, the illustrated example provides each of the port identifiers 5-8 and 14 including a second indication (illustrated by a dashed box, but which may be provided by a particular color (e.g., purple)) that indicates to the fabric connection technician that the ports associated with those port identifiers have had fabric connection component identified for connection to them (discussed in further detail below).

Further still, the illustrated example provides the port identifier 16 including a third indication (illustrated by a bolded box, but which may be provided by a particular color (e.g., red)) that indicates to the fabric connection technician that the port associated with that port identifier have had a fabric connection component connected to it and is associated with one or more errors (discussed in further detail below). Yet further still, the illustrated example provides the port identifier 15 including a fourth indication (illustrated by an eight-point star, but which may be provided by a particular color (e.g., blue)) that indicates to the fabric connection technician that the port associated with that port identifier is currently being connected to the fabric (discussed in further detail below). Yet further still, the illustrated example provides the port identifiers 13 and 25-32 with no indication in order to indicate to the fabric connection technician that the port associated with that port identifier does not have a fabric connection component connected, nor have they had a fabric connection component identified for connection to them. However, while a particular port connection status section 810 on the fabric connection assist screen 804 is illustrated and described, one of skill in the art in possession of the present disclosure will appreciate how the connection status for port to the fabric may be indicated in a variety of manners that would be apparent to one of skill in the art in possession of the present disclosure.

In the illustrated embodiment, the fabric connection assist screen 804 also includes a port connection information section 812 that provides information about the connection of ports on the fabric device 206 that includes the port that is currently being connected to the fabric. As such, in the specific example illustrated in FIG. 8C, the port connection information section 812 includes information about port identifier 13 (e.g., indicated that a fabric connection component has not connected or identified for that port), port identifier 14 (e.g., identifying a identified fabric connection component for that port), port identifier 15 (e.g., identifying a identified fabric connection component device for that port), and port identifier 16 (identifying a connected fabric connection component for that port that has errors). Furthermore, one of skill in the art in possession of the present disclosure will appreciate that the port connection information section 812 is a scrollable section that allows information about the connection of any of the ports on the fabric device 206 to be viewed by the fabric connection technician. As illustrated in FIG. 8C and discussed in further detail below, the port connection information section 812 may be configured to provide an identified fabric connection component indicator 812a to indicate a fabric connection component (e.g., a direct-attach cable in the illustrated example) that has been identified for connection to the port that is currently being connected to the fabric.

In the illustrated embodiment, the fabric connection assist screen 804 also includes a port information section 814 that provides information about the port on the fabric device 206 that is currently being connected to the fabric. As such, in the specific example illustrated in FIG. 8C, the port information section 814 may include information about a transceiver module connected to port "15" such as a length cable assembly, a nominal speed, a transceiver specification compliance identifier, a 10/25/40/100G ethernet compliance identifier, a module date code, a vendor name, a vendor Organizationally Unique Identifier (OUI), a vendor Part Number (PN), a vendor revision (REV), and a vendor Serial Number (SN) Furthermore, one of skill in the art in possession of the present disclosure will appreciate that the port information section 814 is a scrollable section that allows additional information about the port "15" on the fabric device 206 to be viewed by the fabric connection technician. However, while a specific fabric connection assist screen 804 has been illustrated and described, one of skill in the art in possession of the present disclosure will appreciate how fabric connection assist screens provided according to the teachings of the present disclosure may provide a variety of other information that will fall within the scope of the present disclosure as well.

Figure 9:
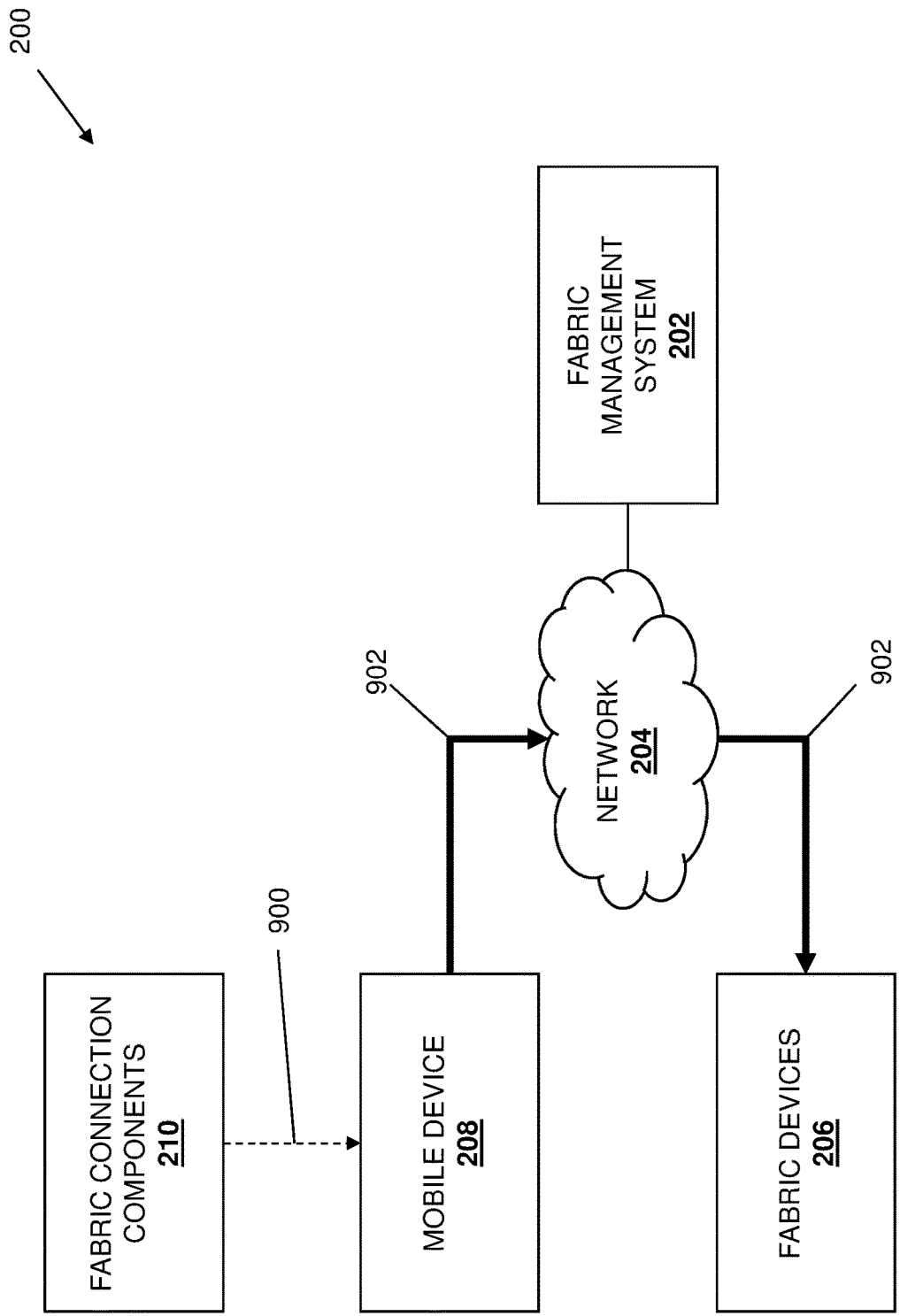
FIG. 9 is a schematic view illustrating an embodiment of the networked system of FIG. 2 operating during the method of FIG. 5.

The method 500 then proceeds to block 508 where the networking device receives an identification from the mobile device of a first fabric connection component indicated by the fabric connection information as being supported by the identified port. In an embodiment, at block 508, the fabric connection technician may utilize the identification the transceiver devices, corresponding cabling options, direct-attach cabling, and/or other fabric connection components that were identified in the fabric connection component identification communication in order to select a transceiver device, cabling, direct-attach cabling, and/or other fabric connection components for the port that is currently being connected to the fabric, as well as identify the selected fabric connection components to the fabric device 206 that includes the port that is currently being connected to the fabric. For example, with reference to FIG. 9, the mobile device 208 may perform fabric connection component selection operations 900 that may include selecting one or more fabric connection components from the fabric connection components 210.

With reference to the example provided above with reference to FIG. 8C, the fabric connection technician may identify the highest priority transceiver device or direct-attach cable included in the supported fabric connection component section 808 on the fabric connection assist screen 804, determine whether that transceiver device or direct-attach cable is included in the fabric connection components 210 (e.g., an inventory of fabric connection components for a datacenter) and, if so, select that transceiver device or direct-attach cable by performing the fabric connection component selection operations 900 that may include utilizing a camera and/or wireless communication subsystem on the mobile device 208 to capture information about that transceiver device or direct-attach cable (e.g., capturing a part identifier (PPID), vendor name, part number, revision, serial number, date code, etc.) via a barcode, Quick Response (QR) code, a Near Field Communication (NFC) tag, a transceiver device description (e.g., via image-to-text scan/conversion software), combinations thereof, and/or any other information capturing techniques that would be apparent to one of skill in the art in possession of the present disclosure. Furthermore, in the event the highest priority transceiver device or direct-attach cable in the supported fabric connection component section 808 on the fabric connection assist screen 804 is not included in the fabric connection components 210, the fabric connection technician may identify the next highest priority transceiver device or direct-attach cable and determine whether that transceiver device or direct-attach able is included in the fabric connection components 210, and the repeat the process above until a supported fabric connection component for the port currently being connected to the fabric is selected.

As such, with reference to the specific example provided above with reference to FIG. 8C, the fabric connection technician may have identified the highest priority direct-attach cable included in the supported fabric connection component section 808 on the fabric connection assist screen 804 (e.g., "DAC-QSFP28-100G-2M 76V43"), determined that direct-attach cable was not included in the fabric connection components 210, and then identified the next highest priority direct-attach cable (e.g., "AOC-QSFP28-100G-3M 05J8P") and determined that direct-attach cable is included in the fabric connection components 210. In response, the fabric connection technician may have then utilized a camera and/or wireless communication subsystem on the mobile device 208 to capture information about that direct-attach cable (e.g., a PPID, vendor name, part number, revision, serial number, date code, etc.) via a barcode, QR code, a NFC tag, a transceiver device description (e.g., via image-to-text scan/conversion software), combinations thereof, and/or any other information capturing techniques that would be apparent to one of skill in the art in possession of the present disclosure. Furthermore, in response to the selection of the direct-attach cable during the fabric connection component selection operations 900, the supported fabric connection component section 808 may provide the identified fabric connection component indicator 808a to indicate the direct-attach cable that has been selected/identified for connection to the port that is currently being connected to the fabric, and the port connection information section 812 may provide the identified fabric connection component indicator 812a to indicate the direct-attach cable that has been identified for connection to the port that is currently being connected to the fabric.

With reference back to FIG. 9, in an embodiment and in response to the selection of the fabric connection component as part of the fabric connection component selection operations 900, the mobile device 208 may perform fabric connection component identification operations 902 that include identifying the selected fabric connection component via the network 204 to the fabric device 206 that includes the port currently being connected to the fabric. For example, in response to the capture of information about the direct-attach cable during the fabric connection component selection operations 900, the fabric connection assist engine 404 in the mobile device 208/400 may automatically transmit the captured information via its communication system 408 and via the network 204 to the fabric device 206 that includes the port currently being connected to the fabric. As such, the fabric connection assist engine 304 in the fabric device 206/300 206 that includes the port currently being connected to the fabric may receive that direct-attach cable identification via its communication system 308, and may store that direct-attach cable identification in its fabric connection assist database 306.

While a direct-attach cable has been described as being selected for the port that is currently being connected to the fabric, one of skill in the art in possession of the present disclosure will appreciate how the fabric connection technician may select a transceiver device, which may allow for the selection of cabling from cabling options recommended via the fabric connection assist screen 804, as well as any other fabric connection components recommended via the fabric connection assist screen 804. Furthermore, while the selection of fabric connection components for a particular port on a fabric device has been described, one of skill in the art in possession of the present disclosure will appreciate that the fabric connection assist screen 804 may allow the fabric connection technician to select different ports for current connection to the fabric (e.g., after using the fabric connection assist screen 804 to select fabric connection components for the port "15" discussed above, the fabric connection technician may use the fabric connection assist screen 804 to select fabric connection components for other ports as well in order to enable the fabric connection technician to collect transceiver devices, corresponding cabling, direct-attach cabling, and other fabric connection components for a group of ports prior to connecting those ports to the fabric). As such, following block 508, transceiver devices, corresponding cabling, direct-attach cabling, and/or other fabric connection components have been collected for one or more ports (e.g., in the crash cart discussed above), and the fabric device(s) including those ports have identified those fabric connection components as having been selected for those ports. As such, with reference to the specific example provided above with reference to FIG. 8C, the port connection status section 810 indicates that the fabric connection component have been identified/selected for ports associated with the port identifiers 5, 6, 7, 8, 14, and 15, and the fabric connection technician may proceed to the fabric device 206 that includes those ports in order to connect the selected/identified fabric connection components.

Figure 10:
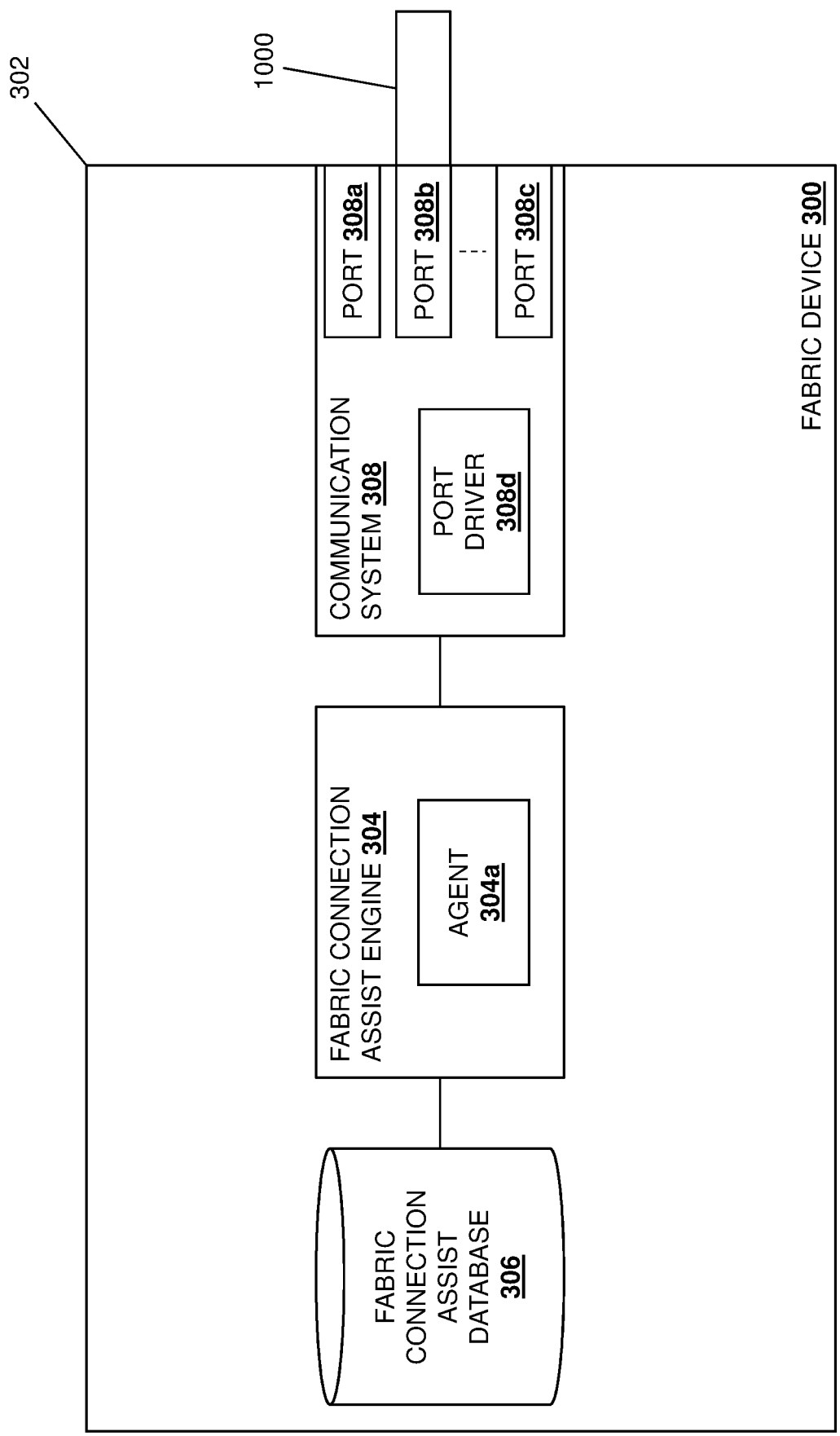
FIG. 10 is a schematic view illustrating an embodiment of the fabric device of FIG. 3 operating during the method of FIG. 5.

The method 500 then proceeds to decision block 510 where it is determined whether the first fabric connection component has been connected to the identified port. In an embodiment, at decision block 510, the fabric connection assist engine 304 in the fabric device 206/300 including the port that is currently being connected to the fabric may monitor the ports 308a-308c in the communication system 308 to determine whether a fabric connection component has been connected to any of those ports 308a-308c. Continuing with the example provided above, after selecting the direct-attach cable for the port (e.g., port "15") on the fabric device 206 that is currently being connected to the fabric, the fabric connection technician may attempt to connect that direct-attach cable to that port. With reference to FIG. 10, a direct-attach cable 1000 is illustrated as having been connected to the port 308b, and at decision block 510 the fabric connection assist engine 304 in the fabric device 206/300 including the port that is currently being connected to the fabric may detect the connection of the direct-attach cable 1000 to the port 308b and determine whether that direct-attach cable 1000 is the direct-attach cable that was identified for connection to that port 308b (i.e., whether the direct-attach cable 1000 is the direct-attach cable that was identified by the fabric connection technician for connection to the port (e.g., port "15" in the examples above) on the fabric device 206 that is currently being connected to the fabric).

If, at decision block 510, it is determined that the first fabric connection component has not been connected to the identified port, the method 500 proceeds to optional block 512 where the networking device may transmit a port error communication to the mobile device. With reference to FIG. 11A, in embodiments like that illustrated in FIG. 10 where the direct-attach cable 1000 was connected to the port 308b and the fabric connection assist engine 304 in the fabric device 206/300 determines that the direct-attach cable 1000 is not the direct-attach cable that was identified for connection to that port 308b, at optional block 512 the fabric connection assist engine 304 in the fabric device 206/300 may perform port error communication operations 1100 that include generating and transmitting a port error communication through its communication system 308 and via the network 204 to the mobile device 208.

In a specific example of such an embodiment, at decision block 510 and following the connection of the direct-attach cable 1000 to the port 308b, the fabric connection assist engine 304 in the fabric device 206/300 may retrieve direct-attach cable information that identifies the direct-attach cable 1000 from an Electronically Erasable Programmable Read Only Memory (EEPROM), may perform one or more qualification checks, may initialize the port 308b, and may determine whether configuration mismatches between the port 308b and the direct-attach cable 1000 exist. As will be appreciated by one of skill in the art in possession of the present disclosure, information obtained after the connection of the direct-attach cable 1000 to the port 308b may allow for a determination that the direct-attach cable 1000 does not match the direct-attach cable that was identified for connection to the port 308b.

In response, the fabric connection assist engine 304 in the fabric device 206/300 may transmit the port error communication such that it is received by the fabric connection assist engine 404 in the mobile device 208/400, and the fabric connection assist engine 404 in the mobile device 208/400 may modify the port connection status section 810 in the fabric connection assist screen 804 to indicate a port error (e.g., the connection of an incorrect fabric connection component to a port, which may be indicated similarly to the error indication for port indicator 16 illustrated in FIG. 8C), and may modify the port connection information section 812 in the fabric connection assist screen 804 to indicate that port error as well (e.g., similarly to the error indication for port 16 illustrated in FIG. 8C). As will be appreciated by one of skill in the art in possession of the present disclosure, the direct-attach cable information retrieved from the EEPROM of the direct-attach cable 1000 may be provided by the fabric connection assist engine 304 in the fabric device 206/300 to the fabric connection assist engine 404 in the mobile device 208/400 as part of the port error communication, and which allows that information to be displayed in the port connection information section 812 on the fabric connection assist screen 804 as well.

While the connection of an incorrect fabric connection component to a port on a fabric device that includes the port currently being connected to the fabric allows a port error to be displayed on the fabric connection assist screen 804 provided by the mobile device 208/400, one of skill in the art in possession of the present disclosure will appreciate that the connection of an incorrect fabric connection component to a port on a fabric device that does not include the port currently being connected to the fabric will not allow a similar port error to be displayed on the fabric connection assist screen 804 provided by the mobile device 208/400, and the fabric connection technician may interpret a failure to receive any indication about the connection of a fabric connection component to a port on a fabric device as an indication that that fabric connection component was connected to a port on the wrong fabric device (i.e., a fabric device other than the fabric device that includes the port currently being connected to the fabric). The method 500 may then return to block 504.

As such, any time the fabric technician identifies a port on a fabric device, receives an identification of fabric connection components supported by that port, selects one of those supported fabric connection components for connection to the fabric device and identifies that fabric connection component to the fabric device, and then connects the wrong fabric connection component to that port or connects that fabric connection component to the wrong port, the fabric device will either cause the mobile device to indicate that port error to the fabric connection technician, or may provide no indication of a fabric connection component connection (i.e., if the fabric connection component was connected to the wrong fabric device), thus indicating to that fabric connection technician that something is wrong with the fabric connection component/port connection that was just made, thus allowing the fabric connection technician to disconnect that fabric connection component from that port, and repeat blocks 504-510 again until an indication is provided on the mobile device that is not a port error, an example of which is discussed further below.

Figure 11B:
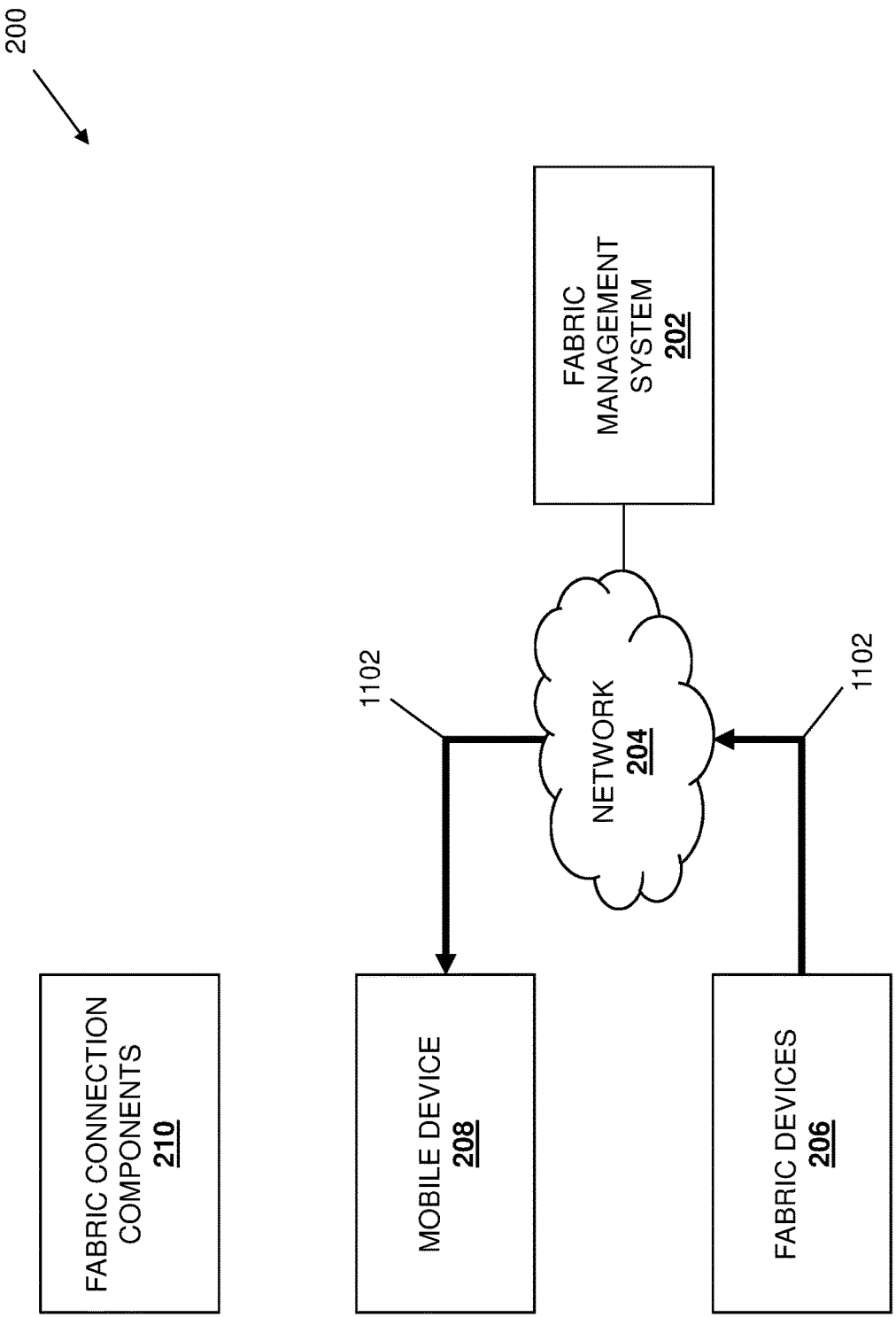
FIG. 11B is a schematic view illustrating an embodiment of the networked system of FIG. 2 operating during the method of FIG. 5.

If at decision block 510, it is determined that the first fabric connection component has been connected to the identified port, the method 500 proceeds to block 514 where the networking device transmits an identified fabric connection component confirmation communication to the mobile device. With reference to FIG. 11B, in embodiments like that illustrated in FIG. 10 where the direct-attach cable 1000 was connected to the port 308b and the fabric connection assist engine 304 in the fabric device 206/300 determines that the direct-attach cable 1000 is the direct-attach cable that was identified for connection to that port 308b, at block 514 the fabric connection assist engine 304 in the fabric device 206/300 may perform identified fabric connection component confirmation communication operations 1102 that include generating and transmitting a identified fabric connection component confirmation communication through its communication system 308 and via the network 204 to the mobile device 208.

Similarly as discussed below, in a specific example of decision block 510 and following the connection of the direct-attach cable 1000 to the port 308b, the fabric connection assist engine 304 in the fabric device 206/300 may retrieve direct-attach cable information that identifies the direct-attach cable 1000 from an Electronically Erasable Programmable Read Only Memory (EEPROM), may perform one or more qualification checks, may initialize the port 308b, and may determine whether configuration mismatches between the port 308b and the direct-attach cable 1000 exist. As will be appreciated by one of skill in the art in possession of the present disclosure, information obtained after the connection of the direct-attach cable 1000 to the port 308b may allow for a determination that the direct-attach cable 1000 matches the direct-attach cable that was identified for connection to the port 308b.

Figure 12:
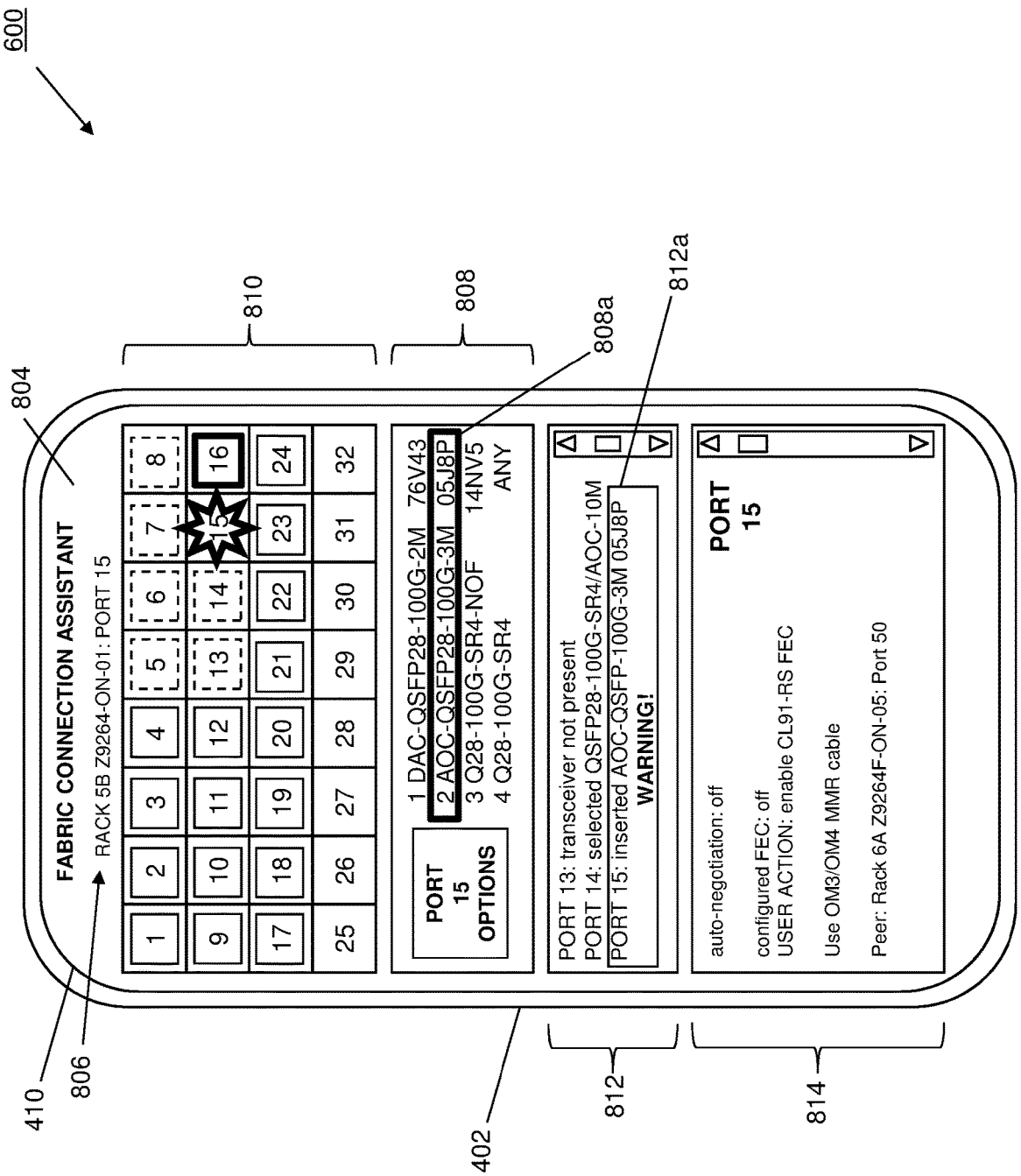
FIG. 12 is a schematic view illustrating an embodiment of the mobile device of FIG. 4 operating during the method of FIG. 5.

With reference to FIG. 12, the fabric connection assist engine 304 in the fabric device 206/300 may transmit the identified fabric connection component confirmation communication such that it is received by the fabric connection assist engine 404 in the mobile device 208/400, and the fabric connection assist engine 404 in the mobile device 208/400 may modify the port connection status section 810 in the fabric connection assist screen 804 to indicate an identified fabric connection component confirmation (e.g., the connection of a correct fabric connection component to a port, which may be indicated by the bold eight-pointed star indication for port indicator 15 illustrated in FIG. 12), and may modify the port connection information section 812 in the fabric connection assist screen 804 to indicate that identified fabric connection component confirmation as well (e.g., indicating the insertion of the identified fabric connection component). As will be appreciated by one of skill in the art in possession of the present disclosure, the direct-attach cable information retrieved from the EEPROM of the direct-attach cable 1000 may be provided by the fabric connection assist engine 304 in the fabric device 206/300 to the fabric connection assist engine 404 in the mobile device 208/400 as part of the identified fabric connection component confirmation communication, which allows that information to be displayed in the port connection information section 812 in the fabric connection assist screen 804 as well.

The method 500 then proceeds to decision block 516 where it is determined whether an identified fabric connection component/port configuration error is detected. In an embodiment, at decision block 516, the method 500 may proceed depending on whether a fabric connection component/port configuration error was detecting following the connection of the direct-attach cable 1000 to the port 308b. As discussed above, following the connection of the direct-attach cable 1000 to the port 308b, the fabric connection assist engine 304 in the fabric device 206/300 may retrieve direct-attach cable information that identifies the direct-attach cable 1000 from an Electronically Erasable Programmable Read Only Memory (EEPROM), may perform one or more qualification checks, may initialize the port 308b, and may determine whether configuration mismatches between the port 308b and the direct-attach cable 1000 exist.

If, at decision block 510, it is determined that an identified fabric connection component/port configuration error is detected, the method 500 proceeds to block 518 where the networking device may transmit a configuration error communication to the mobile device. In an embodiment, at block 518 and when configuration mismatches between the port 308b and the direct-attach cable 1000 were identified following their connection, the fabric connection assist engine 304 in the fabric device 206/300 may transmit the a configuration error communication as part of the identified fabric connection component confirmation communication operations 1102 such that it is received by the fabric connection assist engine 404 in the mobile device 208/400, and the fabric connection assist engine 404 in the mobile device 208/400 may modify the port connection information section 812 in the fabric connection assist screen 804 to indicate that configuration error as well.

With reference to FIG. 12, the port connection information section 812 in the fabric connection assist screen 804 indicates the configuration error with a "WARNING!", and the port information section 814 in the fabric connection assist screen 804 identifies configuration error details that include that the configured FEC status is "off". In some embodiments, the fabric connection assist engine 304 in the fabric device 206/300 may have also determined a configuration error remediation operation associated with the configuration error, and that configuration error remediation operations may be provided for the display on the port information section 814 in the fabric connection assist screen 804 (e.g., "USER ACTION: enable CL91-RS FEC"). As such, the fabric connection technician may perform the configuration error remediation operations themselves, or may report the configuration error (and the configuration error remediation operation in some cases) to a network administrator.

While a specific configuration error has been described, one of skill in the art in possession of the present disclosure will appreciate that other configuration errors may be identified and reported via the mobile device 208. For example, configuration mismatches may be identified and reported that include cable/transceiver device type and breakout configuration mismatches, auto-negotiation configurations enabled for optical fiber media, FEC configurations enabled for Long Range (LR) transceiver devices, breakout cable unsupported by ports, low/high power mode mismatches, Pulse Amplitude Modulation 4-level (PAM4) port mode enabled with a cable that only supports Non-Return-to-Zero (NRZ) encoding, and/or other configuration mismatches that would be apparent to one of skill in the art in possession of the present disclosure. Furthermore, form factor mismatches may be identified and reported that include the connection of high-speed transceiver devices into low speed ports (e.g., connecting a 100G fiber optic fabric connection components into a native 40G port), the connection of a QSFP-to-SFP adapter module (QSA) with a 25G fiber optic fabric connection component), and/or other form factor mismatches that would be apparent to one of skill in the art in possession of the present disclosure. Further still, media part number mismatches may be identified and reported that include 1G copper Small Form-factor Pluggable (SFP) transceiver devices connected to networking operating systems that do not support them. As such, a variety of configuration errors may be identified and reported via the mobile device 208 while remaining within the scope of the present disclosure.

If at decision block 516, it is determined that no identified transceiver device/port configuration error is detected, the method 500 returns to block 504. As such, any time the fabric technician identifies a port on a fabric device, receives an identification of fabric connection components supported by that port, selects one of those supported fabric connection components for connection to the fabric device and identifies that fabric connection component to the fabric device, and then connects the correct fabric connection component to that port, the fabric device will cause the mobile device to indicate that correct fabric connection component/port connection to the fabric connection technician, as well as any configuration errors if they exist with the fabric connection component/port connection, thus indicating to that fabric connection technician that their desired fabric connection component/port connection was just made, thus allowing the fabric connection technician to proceed to connecting a different port to the fabric.

Furthermore, with reference to FIG. 12, the port information section 814 in the fabric connection assist screen 804 may also identify a suggested cabling option (e.g., "use OM3/OM4 MMF cable") for the port that was just connected to the fabric (e.g., port "15" connected to a fiber optic transceiver device in this example), which allows the fabric connection technician to connect that suggested cabling option to the transceiver device that was correctly connected to that port. As can also be seen in the FIG. 12, the port information section 814 in the fabric connection assist screen 804 may also identify a port on a peer fabric device 206 (that should be connected to the port that was just connected to the fabric), and location details for that port/peer fabric device 206 (e.g., "Peer: Rack 6A Z9264F-ON-05: port 50"). For example, the identification of the port on the peer fabric device may be provided by a hyperlink that, when selected, may cause the fabric connection assist application provided by the fabric connection assist engine 404 in the mobile device 208/400 to disconnect from the session with the fabric device including the port that was just connected to the fabric, and establish a session with the peer fabric device identified by the hyperlink, which may allows the fabric connection technician to complete the connection between the two fabric devices (e.g., by connecting a transceiver device and corresponding cable to the peer fabric device, or connecting the direct-attach cable to the peer fabric device).

While not described in detail herein, one of skill in the art in possession of the present disclosure will appreciate how the fabric connection assist application provided by the fabric connection assist engine 404 in the mobile device 208/400 may monitor and record fabric connection technician actions, timing, and/or other fabric connection details, which allows metrics to be collected about each fabric connection technician that may be utilized to improve fabric connection efficiency.

Thus, systems and methods have been described that provide for the communication between switch devices that are being connected to a fabric and a mobile phone utilized by a fabric connection technician in order to inform the fabric connection technician a variety of information about fabric connection component for use in providing that fabric connection, and provide a feedback loop that indicates when a desired fabric connection has been achieved. For example, the fabric connection assist system of the present disclosure may include a switch device coupled to a fabric management system and a mobile phone via a network. The switch device receives first fabric connection information for its first port from the fabric management system. When the mobile phone subsequently identifies the first port to the switch device, the switch device identifies fabric connection components to the mobile phone that are indicated by the first fabric connection information as being supported by the first port. When the mobile phone subsequently identifies a first of the fabric connection components to the switch device, and the switch device then detects that the first fabric connection component has been connected to the first port, the switch device transmits a first fabric connection component confirmation communication to the mobile phone that is configured to display a confirmation on the mobile phone of the connection of the first fabric connection component to the first port. As such, fabric connection technicians may be assisted via their mobile phone throughout the connection of the switch device to the fabric, with a feedback loop providing an indication when a desired fabric connection for the switch device has been provided, thus reducing errors in the connection of switch devices to the fabric.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A fabric connection assist system, comprising:
 a fabric management system;
 a mobile device; and
 a networking device that is connected to the fabric management system and the mobile device via a network, wherein the networking device is configured to:
  receive, from the fabric management system via the network, first fabric connection information for a first port on the networking device, wherein the first fabric connection information identifies a plurality of fabric components that are supported by the first port for connecting the first port to a fabric;
  receive, from the mobile device via the network, an identification of the first port;
  identify, to the mobile device via the network in response to receiving the identification of the first port, the plurality of fabric connection components that are identified by the first fabric connection information as being supported by the first port for connecting the first port to a fabric;
  receive, from the mobile device via the network, an identification of a first fabric connection component that is included in the plurality of fabric connection components that are identified by the first fabric connection information as being supported by the first port for connecting the first port to a fabric;
  detect that the first fabric connection component has been connected to the first port; and
  transmit, to the mobile device via the network in response to detecting the first fabric connection component has been connected to the first port, a first fabric connection component confirmation communication that is configured to display on the mobile device a confirmation of the connection of the first fabric connection component to the first port.

2. The system of claim 1, wherein the networking device is configured to:
 identify, to the mobile device via the network in response to receiving the identification of the first port, at least one cable that is identified by the first fabric connection information for connecting the first port to a fabric.

3. The system of claim 1, wherein the networking device is configured to:
 receive, from the fabric management system via the network, second fabric connection information for a second port on the networking device, wherein the second fabric connection information identifies a plurality of fabric components that are supported by the second port for connecting the second port to a fabric;
 receive, from the mobile device via the network, an identification of the second port;
 identify, to the mobile device via the network in response to receiving the identification of the second port, the plurality of fabric connection components that are identified by the second fabric connection information as being supported by the second port for connecting the second port to a fabric;
 receive, from the mobile device via the network, an identification of a second fabric connection component that is included in the plurality of fabric connection components that are identified by the second fabric connection information as being supported by the second port for connecting the second port to a fabric;
 determine that the second fabric connection component has not been connected to the second port; and
 transmit, to the mobile device via the network in response to detecting the second fabric connection component has not been connected to the second port, a second port error communication that is configured to display on the mobile device a port connection error associated with the second port.

4. The system of claim 1, wherein the networking device is configured to:
 detect a configuration error associated with the connection of the first fabric connection component and the first port; and
 transmit, to the mobile device via the network in response to detecting the configuration error associated with the connection of the first fabric connection component and the first port, a configuration error communication that is configured to display on the mobile device the configuration error associated with the first fabric connection component and the first port.

5. The system of claim 4, wherein the networking device is configured to:
 determine a configuration error remediation operation associated with the connection of the first fabric connection component and the first port, wherein the configuration error communication is configured to display on the mobile device the configuration error remediation operation.

6. The system of claim 1, wherein the networking device is configured to:
 establish, via a fabric connection assist agent included on the networking device, a fabric connection session with a fabric connection application included on the mobile device.

7. An Information Handling System (IHS), comprising:
 a processing system; and
 a memory system that is coupled to the processing system and that includes instructions that, when executed by the processing system, cause the processing system to provide a fabric connection assist engine that is configured to:
  receive, from a fabric management system via a network, first fabric connection information for a first port coupled to the processing system, wherein the first fabric connection information identifies a plurality of fabric components that are supported by the first port for connecting the first port to a fabric;
  receive, from a mobile device via the network, an identification of the first port;
  identify, to the mobile device via the network in response to receiving the identification of the first port, the plurality of fabric connection components that are identified by the first fabric connection information as being supported by the first port for connecting the first port to a fabric;

receive, from the mobile device via the network, an identification of a first fabric connection component that is included in the plurality of fabric connection components that are identified by the first fabric connection information as being supported by the first port for connecting the first port to a fabric;

detect that the first fabric connection component has been connected to the first port; and transmit, to the mobile device via the network in response to detecting the first fabric connection component has been connected to the first port, a first fabric connection component confirmation communication that is configured to display on the mobile device a confirmation of the connection of the first fabric connection component to the first port.

8. The IHS of claim 7, wherein the fabric connection assist engine is configured to:

identify, to the mobile device via the network in response to receiving the identification of the first port, at least one cable that is identified by the first fabric connection information for connecting the first port to a fabric.

9. The IHS of claim 7, wherein the fabric connection assist engine is configured to:

receive, from the fabric management system via the network, second fabric connection information for a second port coupled to the processing system, wherein the second fabric connection information identifies a plurality of fabric components that are supported by the second port for connecting the second port to a fabric;

receive, from the mobile device via the network, an identification of the second port;

identify, to the mobile device via the network in response to receiving the identification of the second port, the plurality of fabric connection components that are identified by the second fabric connection information as being supported by the second port for connecting the second port to a fabric;

receive, from the mobile device via the network, an identification of a second fabric connection component that is included in the plurality of fabric connection components that are identified by the second fabric connection information as being supported by the second port for connecting the second port to the fabric;

determine that the second fabric connection component has not been connected to the second port; and transmit, to the mobile device via the network in response to detecting the second fabric connection component has not been connected to the second port, a second port error communication that is configured to display on the mobile device a port connection error associated with the second port.

10. The IHS of claim 7, wherein the fabric connection assist engine is configured to:

detect a configuration error associated with the connection of the first fabric connection component and the first port; and transmit, to the mobile device via the network in response to detecting the configuration error associated with the connection of the first fabric connection component and the first port, a configuration error communication that is configured to display on the mobile device the configuration error associated with the first fabric connection component and the first port.

11. The IHS of claim 10, wherein the fabric connection assist engine is configured to:

determine a configuration error remediation operation associated with the connection of the first fabric connection component and the first port, wherein the configuration error communication is configured to display on the mobile device the configuration error remediation operation.

12. The IHS of claim 7, wherein the fabric connection assist engine is configured to:

establish, via a fabric connection assist agent included in the fabric connection assist engine, a fabric connection session with a fabric connection application included on the mobile device.

13. The IHS of claim 7, wherein the fabric connection assist engine is configured to:

transmit, to the mobile device via the network in response to receiving the identification of the first fabric connection component, a fabric connection port status update communication that is configured to display on the mobile device an updated status for the first port that indicates the identification of the first transaction device for the first port.

14. A method for assisting with the connection of a fabric, comprising:

receiving, by a networking device from a fabric management system via a network, first fabric connection information for a first port included on the networking device, wherein the first fabric connection information identifies a plurality of fabric components that are supported by the first port for connecting the first port to a fabric;

receiving, by the networking device from a mobile device via the network, an identification of the first port;

identifying, by the networking device to the mobile device via the network in response to receiving the identification of the first port, the plurality of fabric connection components that are identified by the first fabric connection information as being supported by the first port for connecting the first port to a fabric;

receiving, by the networking device from the mobile device via the network, an identification of a first fabric connection component that is included in the plurality of fabric connection components that are identified by the first fabric connection information as being supported by the first port for connecting the first port to a fabric;

detecting, by the networking device, that the first fabric connection component has been connected to the first port; and transmitting, by the networking device to the mobile device via the network in response to detecting the first fabric connection component has been connected to the first port, a first fabric connection component confirmation communication that is configured to display on the mobile device a confirmation of the connection of the first fabric connection component to the first port.

15. The method of claim 14, further comprising:

identifying, by the networking device to the mobile device via the network in response to receiving the identification of the first port, at least one cable that is identified by the first fabric connection information for connecting the first port to a fabric.

16. The method of claim 14, further comprising:

receiving, by the networking device from the fabric management system via the network, second fabric connection information for a second port included on the networking device, wherein the second fabric connection information identifies a plurality of fabric components that are supported by the second port for connecting the second port to a fabric;

receiving, by the networking device from the mobile device via the network, an identification of the second port;

identifying, by the networking device to the mobile device via the network in response to receiving the identification of the second port, the plurality of fabric connection components that are identified by the second fabric connection information as being supported by the second port for connecting the second port to a fabric;

receiving, by the networking device from the mobile device via the network, an identification of a second fabric connection component that is included in the plurality of fabric connection components that are identified by the second fabric connection information as being supported by the second port for connecting the second port to a fabric;

determining, by the networking device, that the second fabric connection component has not been connected to the second port; and transmitting, by the networking device to the mobile device via the network in response to detecting the second fabric connection component has not been connected to the second port, a second port error communication that is configured to display on the mobile device a port connection error associated with the second port.

17. The method of claim 14, further comprising:

detecting, by the networking device, a configuration error associated with the connection of the first fabric connection component and the first port; and transmitting, by the networking device to the mobile device via the network in response to detecting the configuration error associated with the connection of the first fabric connection component and the first port, a configuration error communication that is configured to display on the mobile device the configuration error associated with the first fabric connection component and the first port.

18. The method of claim 17, further comprising:

determining, by the networking device, a configuration error remediation operation associated with the connection of the first fabric connection component and the first port, wherein the configuration error communication is configured to display on the mobile device the configuration error remediation operation.

19. The method of claim 14, further comprising:

establishing, by the networking device via a fabric connection assist agent included in the fabric connection assist engine, a fabric connection session with a fabric connection application included on the mobile device.

20. The method of claim 14, further comprising:

transmitting, by the networking device to the mobile device via the network in response to receiving the identification of the first fabric connection component, a fabric connection port status update communication that is configured to display on the mobile device an updated status for the first port that indicates the identification of the first transaction device for the first port.

* * * * *